US012792136B2

(12) United States Patent
Comer et al.

(10) Patent No.: US 12,792,136 B2
(45) Date of Patent: Nov. 10, 2026

(54) ANIMATING VIRTUAL AVATAR FACIAL MOVEMENTS

(71) Applicant: Magic Leap, Inc., Plantation, FL (US)

(72) Inventors: Sean Michael Comer, Encino, CA (US); Geoffrey Wedig, Torrance, CA (US)

(73) Assignee: MAGIC LEAP, INC., Plantation, FL (US)

(*) Notice: Subject to any disclaimer, the term of this patent is extended or adjusted under 35 U.S.C. 154(b) by 131 days.

(21) Appl. No.: 18/986,049

(22) Filed: Dec. 18, 2024

(65) Prior Publication Data

US 2025/0244823 A1 Jul. 31, 2025

Related U.S. Application Data

(63) Continuation of application No. 17/871,337, filed on Jul. 22, 2022, now Pat. No. 12,210,666, which is a (Continued)

(51) Int. Cl.

*G06F 3/01* (2006.01)
*G06T 7/11* (2017.01)

(Continued)

(52) U.S. Cl.

CPC ................ *G06F 3/011* (2013.01); *G06T 7/11* (2017.01); *G06T 7/13* (2017.01); *G06T 7/246* (2017.01);

(Continued)

(58) Field of Classification Search

CPC ... G06T 13/40; G06T 7/11; G06T 7/13; G06T 7/246; G06T 2207/20021;

(Continued)

(56) References Cited

U.S. PATENT DOCUMENTS 4,941,193 A 7/1990 Barnsley et al.
6,532,011 B1 3/2003 Francini et al.

(Continued)

FOREIGN PATENT DOCUMENTS

WO WO 2002/009040 1/2002
WO WO 2019/177870 9/2019

OTHER PUBLICATIONS

International Search Report and Written Opinion, re PCT Application No. PCT/US2019/021221, dated May 23, 2019.

(Continued)

*Primary Examiner* — Jin Cheng Wang

(74) *Attorney, Agent, or Firm* — KLINTWORTH & ROZENBLAT LLP

(57) ABSTRACT

Systems and methods generating an animation ng corresponding to a pose of a subject include accessing image data corresponding to the pose of the subject. The image data can include the face of the subject. The systems and methods process the image data by successively analyzing subregions of the image according to a solver order. The solver order can be biologically or anatomically ordered to proceed from subregions that cause larger scale movements to subregions that cause smaller scale movements. In each subregion, the systems and methods can perform an optimization technique to fit parameters of the animation rig to the input image data. After all subregions have been processed, the animation rig can be used to animate an avatar to appear to be performing the pose of the subject.

16 Claims, 17 Drawing Sheets

Related U.S. Application Data continuation of application No. 16/980,220, filed as application No. PCT/US2019/021221 on Mar. 7, 2019, now Pat. No. 11,430,169.

(60) Provisional application No. 62/643,548, filed on Mar. 15, 2018.

(51) Int. Cl.

| | |
|---|---|
| ***G06T 7/13*** | (2017.01) |
| ***G06T 7/246*** | (2017.01) |
| ***G06T 13/40*** | (2011.01) |
| ***G06V 10/74*** | (2022.01) |
| ***G06V 20/20*** | (2022.01) |
| ***G06V 40/16*** | (2022.01) |

(52) U.S. Cl.

CPC ............ *G06T 13/40* (2013.01); *G06V 10/761* (2022.01); *G06V 20/20* (2022.01); *G06V 40/171* (2022.01); *G06V 40/172* (2022.01); *G06V 40/174* (2022.01); *G06F 2203/011* (2013.01)

(58) Field of Classification Search

CPC ........ G06T 2207/30201; G06V 40/171; G06V 40/174; G06V 40/162; G06F 2203/011

See application file for complete search history.

(56) References Cited

U.S. PATENT DOCUMENTS

| | | | | |
|---|---|---|---|---|
| 6,850,221 | B1 | 2/2005 | Tickle | |
| 9,786,084 | B1 * | 10/2017 | Bhat | G06T 15/04 |
| 10,198,845 | B1 * | 2/2019 | Bhat | G06V 40/176 |
| 10,860,838 | B1 | 12/2020 | Elahie et al. | |
| 10,949,648 | B1 | 3/2021 | Cao et al. | |
| 11,430,169 | B2 | 8/2022 | Comer et al. | |
| 2006/0028436 | A1 | 2/2006 | Armstrong | |
| 2007/0081123 | A1 | 4/2007 | Lewis | |
| 2008/0018595 | A1 | 1/2008 | Hildreth et al. | |
| 2012/0127062 | A1 | 5/2012 | Bar-Zeev et al. | |
| 2012/0162549 | A1 | 6/2012 | Gao et al. | |
| 2013/0082922 | A1 | 4/2013 | Miller | |
| 2013/0117377 | A1 | 5/2013 | Miller | |
| 2013/0125027 | A1 | 5/2013 | Abovitz | |
| 2013/0208234 | A1 | 8/2013 | Lewis | |
| 2013/0242262 | A1 | 9/2013 | Lewis | |
| 2014/0035934 | A1 | 2/2014 | Du et al. | |
| 2014/0071539 | A1 | 3/2014 | Gao | |
| 2014/0177023 | A1 | 6/2014 | Gao et al. | |
| 2014/0218468 | A1 | 8/2014 | Gao et al. | |
| 2014/0267420 | A1 | 9/2014 | Schowengerdt | |
| 2015/0016777 | A1 | 1/2015 | Abovitz et al. | |
| 2015/0205126 | A1 | 7/2015 | Schowengerdt | |
| 2015/0213307 | A1 | 7/2015 | Beeler et al. | |
| 2015/0309263 | A2 | 10/2015 | Abovitz et al. | |
| 2015/0313530 | A1 * | 11/2015 | Kodra | G06V 20/41 382/203 |
| 2015/0326570 | A1 | 11/2015 | Publicover et al. | |
| 2015/0346495 | A1 | 12/2015 | Welch et al. | |
| 2015/0356349 | A1 * | 12/2015 | Govindarajeswaran | G06V 40/175 382/103 |
| 2015/0356781 | A1 | 12/2015 | Miller | |
| 2016/0011419 | A1 | 1/2016 | Gao | |
| 2016/0026253 | A1 | 1/2016 | Bradski et al. | |
| 2016/0103306 | A1 | 4/2016 | Takahashi et al. | |
| 2016/0178939 | A1 | 6/2016 | Cheng et al. | |
| 2016/0358365 | A1 | 12/2016 | Sumner et al. | |
| 2017/0039750 | A1 | 2/2017 | Tong et al. | |
| 2017/0053663 | A1 | 2/2017 | Yu et al. | |
| 2017/0193684 | A1 | 7/2017 | Du et al. | |
| 2017/0206696 | A1 | 7/2017 | Bailey et al. | |
| 2017/0213075 | A1 | 7/2017 | Whitehill et al. | |
| 2017/0300741 | A1 | 10/2017 | Seuss et al. | |
| 2017/0372505 | A1 | 12/2017 | Bhat et al. | |
| 2018/0033189 | A1 * | 2/2018 | Ma | G06V 40/174 |
| 2018/0130245 | A1 | 5/2018 | Kozlov et al. | |
| 2018/0174348 | A1 * | 6/2018 | Bhat | G06T 7/73 |
| 2018/0197322 | A1 | 7/2018 | Sagar et al. | |
| 2018/0374242 | A1 | 12/2018 | Li et al. | |
| 2019/0066351 | A1 | 2/2019 | Noh et al. | |
| 2019/0122411 | A1 | 4/2019 | Sachs et al. | |
| 2020/0202604 | A1 | 6/2020 | Otani et al. | |
| 2020/0372245 | A1 | 11/2020 | Juhas et al. | |
| 2021/0012549 | A1 | 1/2021 | Comer | |
| 2022/0366627 | A1 | 11/2022 | Comer et al. | |

OTHER PUBLICATIONS

International Preliminary Report for Patentability, re PCT Application No. PCT/US2019/021221, mailed May 23, 2019.

FACS—Facial Action Coding System (2002 Revision is here), https://www.cs.cmu.edu/~face/facs.htm, in 5 pages, downloaded Feb. 15, 2018.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Cao, et al., "3D Shape Regression for Real-Time Facial Animation," In: ACM Transactions on Graphics (TOG). Jul. 21, 2012, retrieved on May 9, 2019 from <http://www.kunzhou.net/2013/vface.pdf>.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Wikipedia: "COBYLA," https://en.wikipedia.org/wiki/COBYLA, last edited Nov. 2016, in 2 pages.

Wikipedia: Morph target animation, https://en.wikipedia.org/wiki/Morph_target_animation, last edited Aug. 2017 in 2 pages.

Wikipedia: "Facial Action Coding System," https://en.wikipedia./org/wiki/Facial_Action_Coding_System, accessed Dec. 12, 2017 in 9 pages,.

* cited by examiner

ANIMATING VIRTUAL AVATAR FACIAL MOVEMENTS

CROSS-REFERENCE TO RELATED APPLICATIONS

This application is a continuation application of U.S. application Ser. No. 17/871,337, filed on Jul. 22, 2022. U.S. application Ser. No. 17/871,337 is a continuation application of U.S. application Ser. No. 16/980,220, filed Sep. 11, 2020. U.S. application Ser. No. 16/980,220 is a national stage application of 35 USC § 371 of International Application No. PCT/US2019/021221, filed Mar. 7, 2019. International Application No. PCT/US2019/021221 claims priority to U.S. Provisional Patent Application No. 62/643,548, filed Mar. 15, 2018. The present application claims priority to U.S. application Ser. No. 17/871,337, U.S. application Ser. No. 16/980,220, International Application No. PCT/US2019/021221, and U.S. Provisional Patent Application No. 62/643,548, each of which is additionally incorporated herein by reference.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to virtual reality and augmented reality, including mixed reality, imaging and visualization systems and more particularly to rigging systems and methods for animating virtual characters, such as avatars.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Techniques for presenting an interactive virtual, augmented, or mixed reality environment that includes a high fidelity digital avatar are described. For example, an avatar animation system can access an image (e.g., a high quality digitized photographic scan) of a subject and can convert the image into a high fidelity digital avatar using facial mapping techniques that successively solve for facial subregions, rather than solving for all facial subregions simultaneously. The subject can be a human, an animal, or other deformable object.

The Facial Action Coding System (FACS) classifies observable facial expressions based on the appearance of a person's face by decomposing the facial expressions into isolated muscle contractions or relaxations. Each isolated muscle contraction or relaxation of FACS is associated with a numerical representation, referred to as an Action Unit (AU). In some embodiments, the disclosed systems and methods incorporate a facial taxonomy into a facial rig (e.g., a digital puppet corresponding to the human subject) having facial rig parameters directly mapped to the facial taxonomy. The facial taxonomy can (but need not) be based, at least in part, on the FACS taxonomy and the facial rig parameters can (but need not) be based, at least in part, on FACS AUs. The facial rig parameters can be grouped into various facial subregions (e.g., Jaw, Lower Face, Lips, Funneler, Upper Face, Lids, Eyes, Neck, Lip Extras, Tongue, and Miscellaneous Extras).

For each facial subregion, some embodiments of the disclosed system adjust various facial rig parameters of the particular facial subregion to reduce or minimize an error metric between the image of the subject performing a pose and the facial rig parameters of the particular facial subregion. The system iteratively adjusts the facial rig parameters until a termination criterion is met (such as all of the parameters are within an acceptable threshold, as compared to the image or a maximum number of iteration steps has been performed). The output of the system when fitting one facial subregion can be used as the input for a subsequent error minimization process for the next facial subregion. Accordingly, the system can work in a sequence that is mutually constitutive. The sequence order (sometimes referred to as the Solver Order) can flow from highest to lowest impact on fundamental facial movements (e.g., marching in from large areas of movement, such as the jaw, and progressing to more granular details, such as the eyes). Once each of the facial subregions has been solved for, the system can set the facial rig for an avatar corresponding to the image of the subject. The facial rig thereafter can be used to cause the avatar to display an appearance of the subject corresponding to the pose in the input data image.

In various advantageous embodiments, it is this process of hierarchically compounding the results of the solution for each previous subregion in the Solver Order and feeding that solution into the next region in the Solver Order that allows these embodiments of the system to achieve a biologically motivated result that is qualitatively, quantitatively, or computationally robust.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
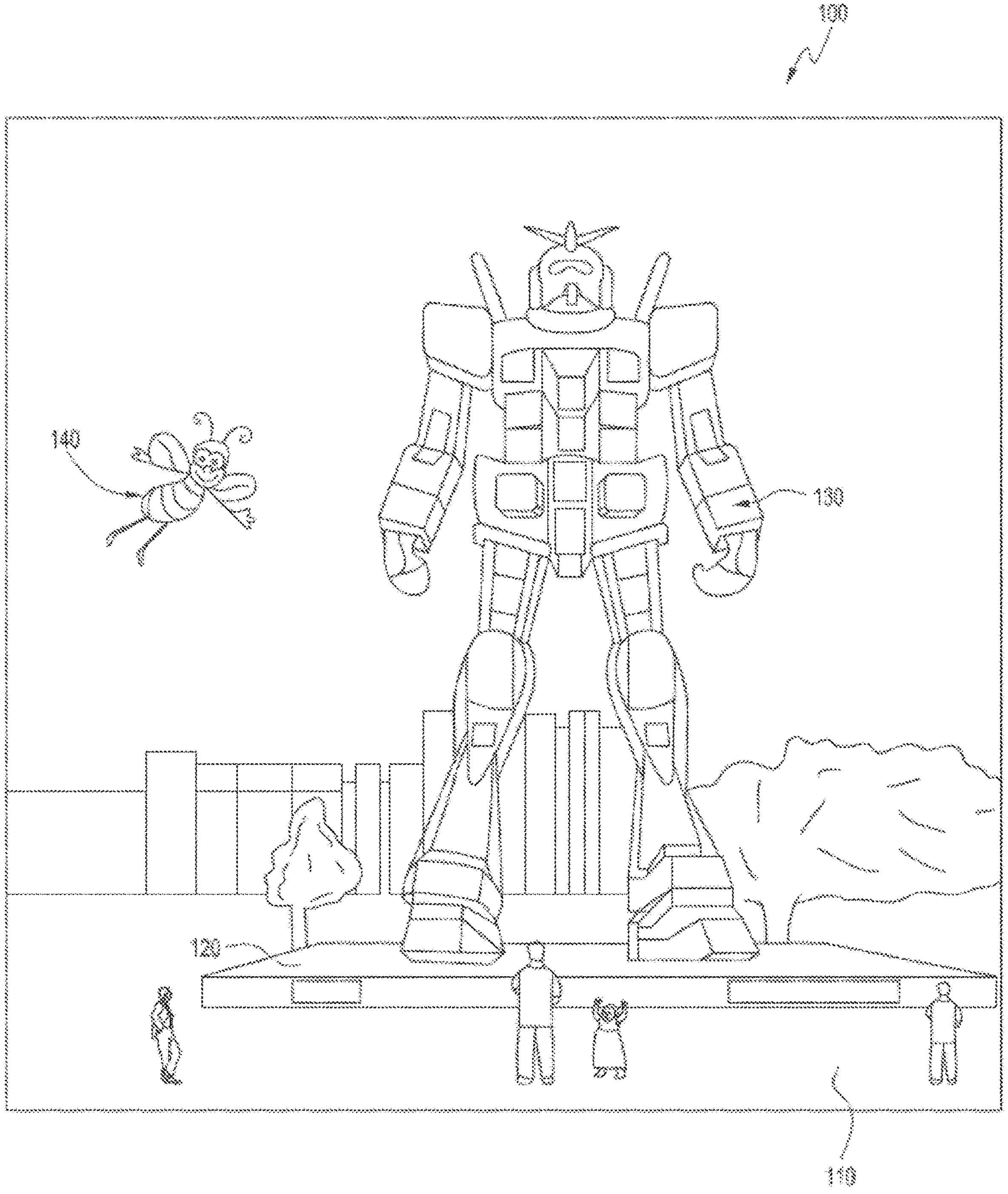
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar may be a virtual representation of a real or fictional person (or creature or personified object) in an ARNR/MR environment. Embodiments of the disclosed systems and methods may provide for improved presentation of an interactive VR/AR/MR environment that includes a high fidelity digital avatar. Creation of a high fidelity digital avatar can take many weeks or months of work by a specialized team and can utilize a large number of high quality digitized photographic scans of the human model.

Embodiments of the disclosed technology have the capability of creating high quality or high fidelity avatars (or digital representations in general) for any human, animal, or other user. In order to accomplish this, embodiments of the disclosed process are faster and less resource intense (e.g., it is not practical to put users through the same scanning process a professional model may experience) while still maintaining an accurate output.

Facial Action Coding System (FACS) is a common system for determining or characterizing movements of human faces or emotions represented by facial movements. FACS can comprise a system to taxonomize human facial movements by their appearance on the face. For example, movements of individual facial muscles can be encoded by FACS from slightly different changes in facial appearance over short time intervals. Using FACS, nearly any anatomically possible facial expression can be coded, for example, by deconstructing the expression into a specific Action Unit (AU) or Action Units. FACS defines AUs, which are a contraction or relaxation of one or more muscles.

The disclosed systems and methods can incorporate the FACS taxonomy into a methodology used by a Facial Solver as fixed boundaries on the human face that are biologically or anatomically ordered (e.g., to represent large scale facial movements down to smaller scale facial movements). The Facial Solver can be implemented as a hardware computing system that can access an input facial image (e.g., as point cloud data or a mesh) and execute instructions to adjust a facial animation rig for an avatar by iteratively solving over a sequence of subregions of the entire face. For example, the subregions of the entire face can comprise, the jaw subregion, the lower face subregion, the eyes subregions, the lips subregion, and so forth. The Facial Solver sequence can be performed in a broad strokes approach, e.g., marching in from large areas of movement, such as the jaw, and progressing to more granular details, such as the eyes. The Facial Solver system can use this approach to solve for the output avatar facial movements from arbitrary geometric or point cloud input data, which digitally represents facial movements (also referred to as poses) of a subject.

The input data representing the subject's facial movement (or movements) can be a three-dimensional (3D) digital representation of imaging scans taken of the subject performing a pose or a sequence of poses. The imaging scans can, for example, be taken by placing the subject in a photogrammetry capture stage comprising multiple cameras (e.g., 60, 80, 120, or more) surrounding and pointed at the subject. The cameras can be synchronized to each other to capture images that can be converted into a 3D scan of the subject performing a pose. The 3D scan can be digitally represented as a mesh of vertices, a point cloud (structured or unstructured), or any other type of representation (e.g., a color-depth image).

Embodiments of the disclosed Facial Solver can convert one set of data (e.g., Data 1 comprising a user image that can be analyzed for unstructured point cloud data) to animation rig data (e.g., Data 2). The Facial Solver can be applied to subregions of the input data and calculate a minimum between Data 1 to Data 2 (e.g., rig format/data) iteratively over the subregions. For example, a first iteration starts with the rig at a neutral expression, and each iteration can adjust the rig controls slightly until a threshold criterion is met when compared to the input user image. The output from the first subregion's minimization can be used as input for the second subregion, and the process can be repeated for all remaining subregions for the entire image until all rig values (e.g., FACS AUs) are determined. The problem of quickly and accurately correlating disparate data (e.g., Data 1 versus Data 2) can be solved by mechanics-motivated and Solver-ordered groupings of facial rig parameters and/or subregions.

For example, as will be further described herein, the Facial Solver can proceed through an ordered set of facial subregions, first fitting larger subregions of the face (e.g., starting with the jaw subregion) and moving on to successively smaller facial subregions (e.g., the eyes) to progressively match an avatar facial rig (e.g., FACS AUs) to an input image of the subject performing a pose (e.g., smiling, frowning, laughing, winking, etc.).

Considerable diagnostics, both quantitative and qualitative, have been evaluated for an embodiment of the Facial Solver, and it has been found that the use of a facial taxonomy of fixed boundaries that are biologically ordered outperforms a typical scalar minimization scheme. The facial taxonomy used by the Facial Solver may, but need not be, based on the FACS taxonomy. Advantageously, the results of the parameter minimization are biologically motivated and may be free from local minima artifacts.

Any of the embodiments of the Facial Solver described herein may be implemented and performed by the avatar processing and rendering system 690, for example, by the 3D model processing system 680. The Facial Solver may be implemented on computer hardware and, in some implementations, the computer hardware may be in wired or wireless communication with the photogrammetry capture stage. Although the examples in this disclosure describe animating a human-shaped avatar, similar techniques can also be applied to animals, fictitious creatures, objects, etc.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenar10 with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
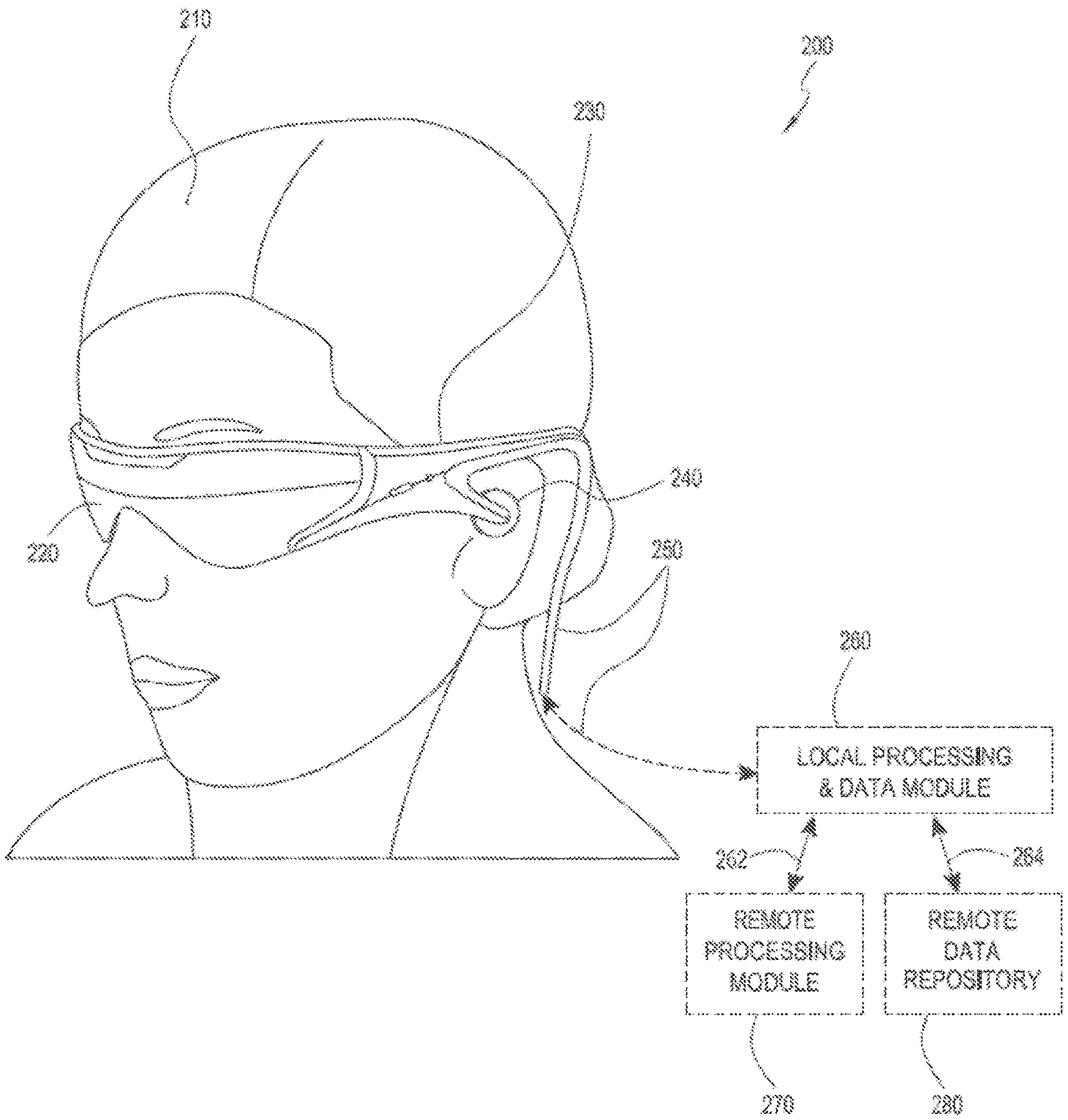
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b)

acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of a Wearable System

Figure 3:
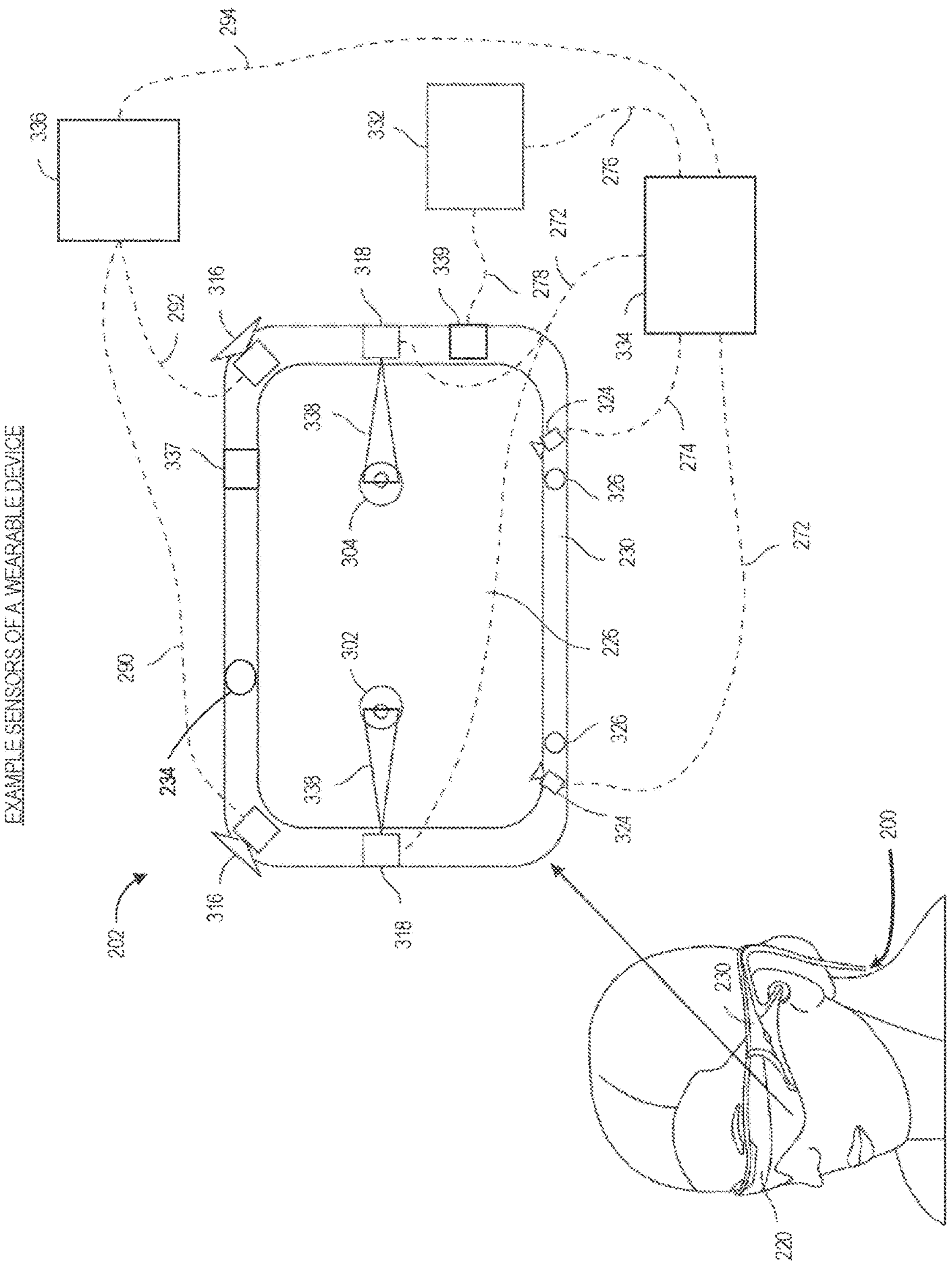
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
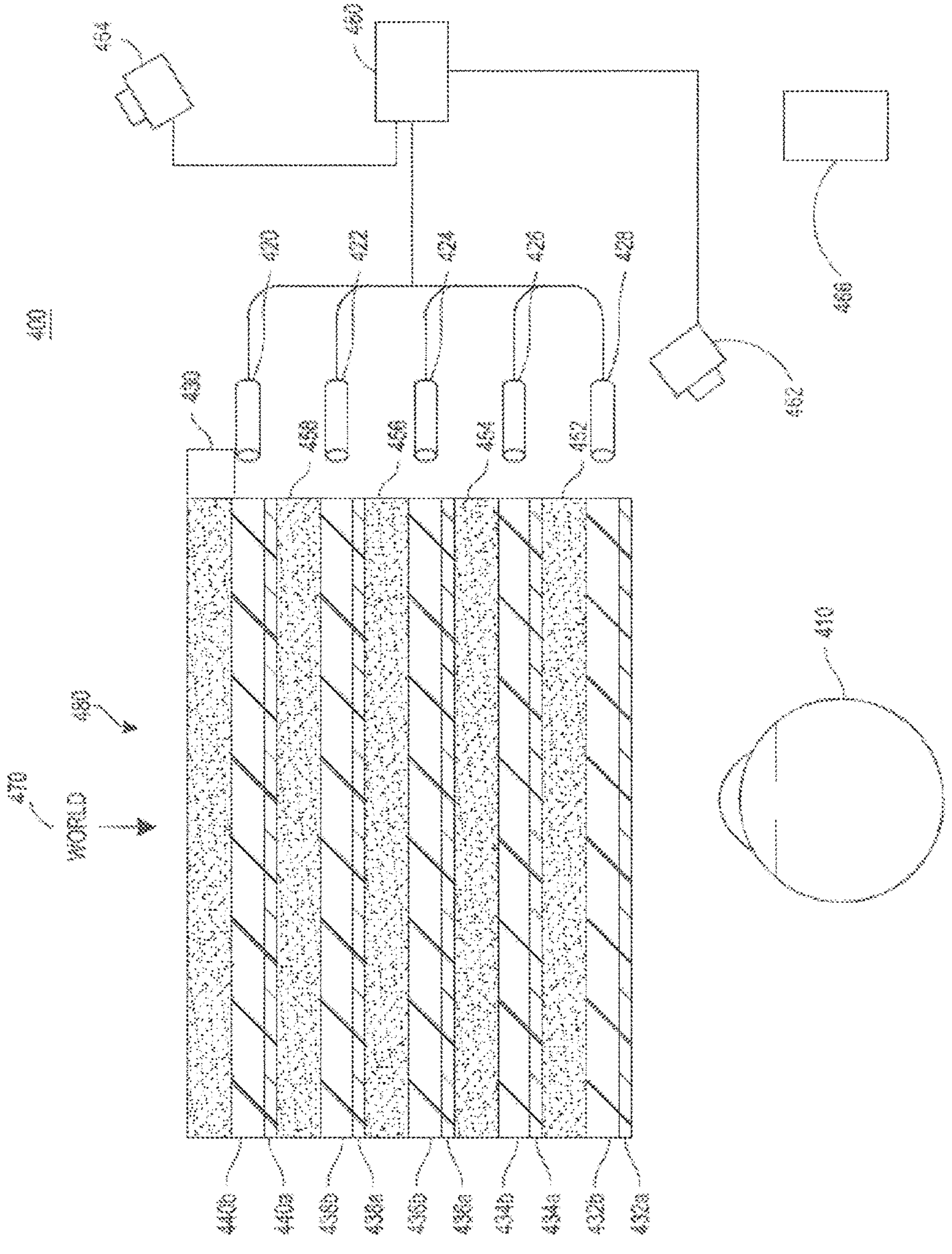
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432*b*, 434*b*, 436*b*, 438*b*, 4400*b*. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432*b*, 434*b*, 436*b*, 438*b*, 440*b* or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440*b*, 438*b*, 436*b*, 434*b*, 432*b*, each of which may be configured to distribute incoming light across each respective waveguide, for output toward the eye 410. Light exits an output surface of the image injection devices 420, 422, 424, 426, 428 and is injected into a corresponding input edge of the waveguides 440*b*, 438*b*, 436*b*, 434*b*, 432*b*. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440*b*, 438*b*, 436*b*, 434*b*, 432*b*, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440*b*, 438*b*, 436*b*, 434*b*, 432*b*. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440*b*, 438*b*, 436*b*, 434*b*, 432*b* may be configured to propagate light within each respective waveguide by total internal reflection (TIR). The waveguides 440*b*, 438*b*, 436*b*, 434*b*, 432*b* may each be planar or have another shape (e.g., curved), with major top and bottom surfaces and edges extending between those major top and bottom surfaces. In the illustrated configuration, the waveguides 440*b*, 438*b*, 436*b*, 434*b*, 432*b* may each include light extracting optical elements 440*a*, 438*a*, 436*a*, 434*a*, 432*a* that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440*a*, 438*a*, 436*a*, 434*a*, 432*a*) may, for example, be reflective or diffractive optical features. While illustrated disposed at the bottom major surfaces of the waveguides 440*b*, 438*b*, 436*b*, 434*b*, 432*b* for ease of description and drawing clarity, in some embodiments, the light extracting optical elements 440*a*, 438*a*, 436*a*, 434*a*, 432*a* may be disposed at the top or bottom major surfaces, or may be disposed directly in the volume of the waveguides 440*b*, 438*b*, 436*b*, 434*b*, 432*b*. In some embodiments, the light extracting optical elements 440*a*, 438*a*, 436*a*, 434*a*, 432*a* may be formed in a layer of material that is attached to a transparent substrate to form the waveguides 440*b*, 438*b*, 436*b*, 434*b*, 432*b*. In some other embodiments, the waveguides 440*b*, 438*b*, 436*b*, 434*b*, 432*b* may be a monolithic piece of material and the light extracting optical elements 440*a*, 438*a*, 436*a*, 434*a*, 432*a* may be formed on a surface or in the interior of that piece of material.

With continued reference to FIG. 4, as discussed herein, each waveguide 440*b*, 438*b*, 436*b*, 434*b*, 432*b* is configured to output light to form an image corresponding to a particular depth plane. For example, the waveguide 432*b* nearest the eye may be configured to deliver collimated light, as injected into such waveguide 432*b*, to the eye 410. The collimated light may be representative of the optical infinity focal plane. The next waveguide up 434*b* may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434*b* as coming from a first focal plane closer inward toward the eye 410 from optical infinity. Similarly, the third up waveguide 436*b* passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436*b* as coming from a second focal plane that is even closer inward toward the person from optical infinity than was light from the next waveguide up 434*b*.

The other waveguide layers (e.g., waveguides 438*b*, 440*b*) and lenses (e.g., lenses 456, 458) are similarly configured, with the highest waveguide 440*b* in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440*a*, 438*a*, 436*a*, 434*a*, 432*a* may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440*a*, 438*a*, 436*a*, 434*a*, 432*a* may be volumetric or surface features, which may be configured to output light at specific angles. For example, the light extracting optical elements 440*a*, 438*a*, 436*a*, 434*a*, 432*a* may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440*a*, 438*a*, 436*a*, 434*a*, 432*a* are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire subregion available for viewing or imaging by a viewer may be referred to as the field of regard (FOR). The FOR may include 4n steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
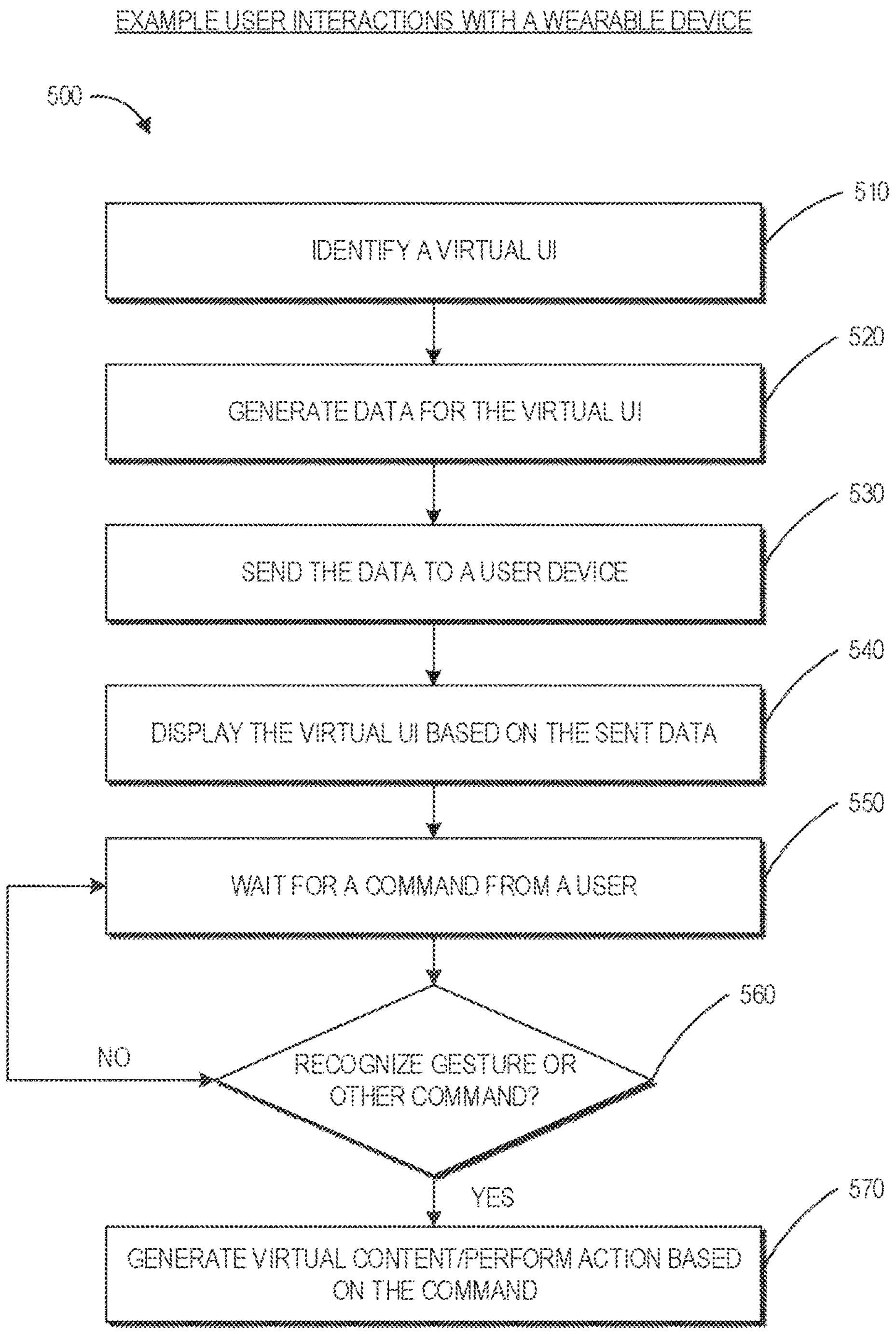
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UL. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UL For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques m order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
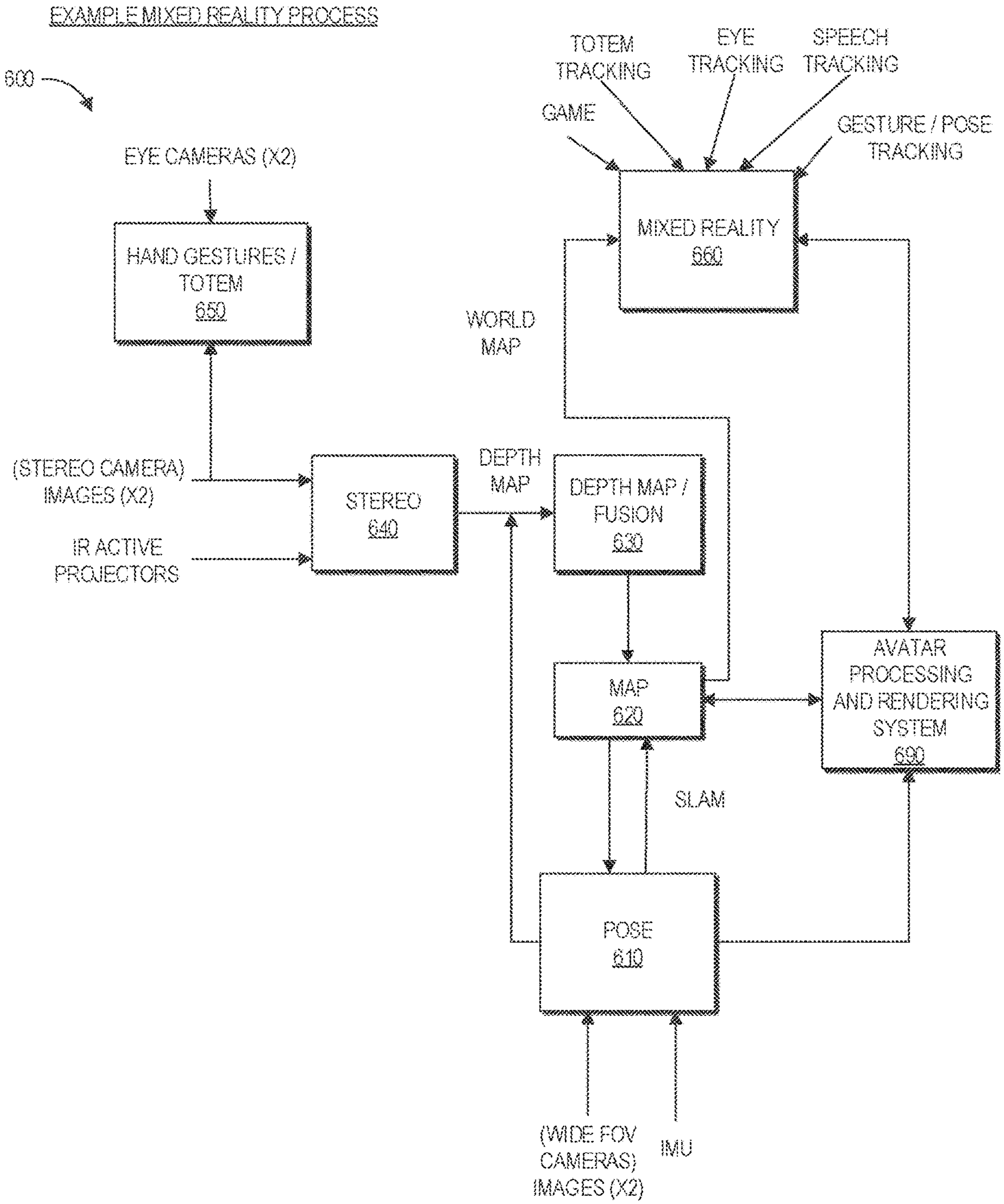
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.).

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UL UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
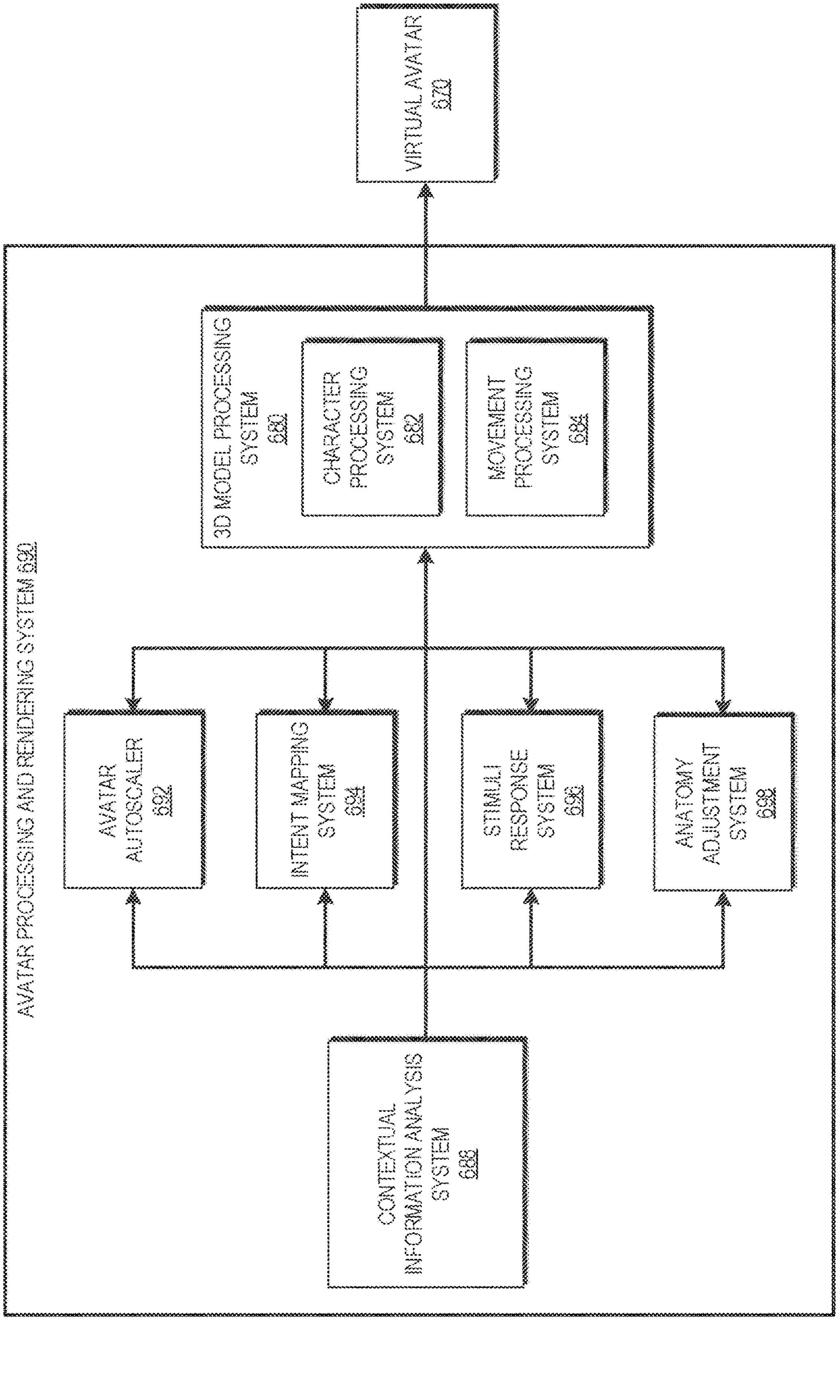
FIG. 6B illustrates example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, or a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images (e.g., photogrammetric scans) acquired by the outward-facing imaging system 464 of the user or the viewer of the user's avatar. The contextual information analysis system 688 can analyze such images alone or in combination with data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). As will further be described with reference to FIGS. 12 and 13, the virtual character processing system 682 can utilize a Facial Solver that solves for an avatar's facial appearance based on an input image of a subject performing a pose. The virtual character processing system 682 can access an image of a subject or data corresponding to an image of the subject (for example, data comprising an image that can be analyzed for structured or unstructured point cloud data, a mesh of vertices), and the Facial Solver can successively solve for facial subregions of the entire face, rather than solving for the entire face simultaneously. The Facial Solver can execute in a broad strokes approach (e.g., marching in from facial subregions corresponding to large areas of movement, such as the jaw, and progressing to more facial subregions correspond to granular details such as the eyes) until a distance error between the input image and each facial subregion of the facial rig is reduced or minimized.

The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc.

Examples of Mapping a User's Environment

Figure 7:
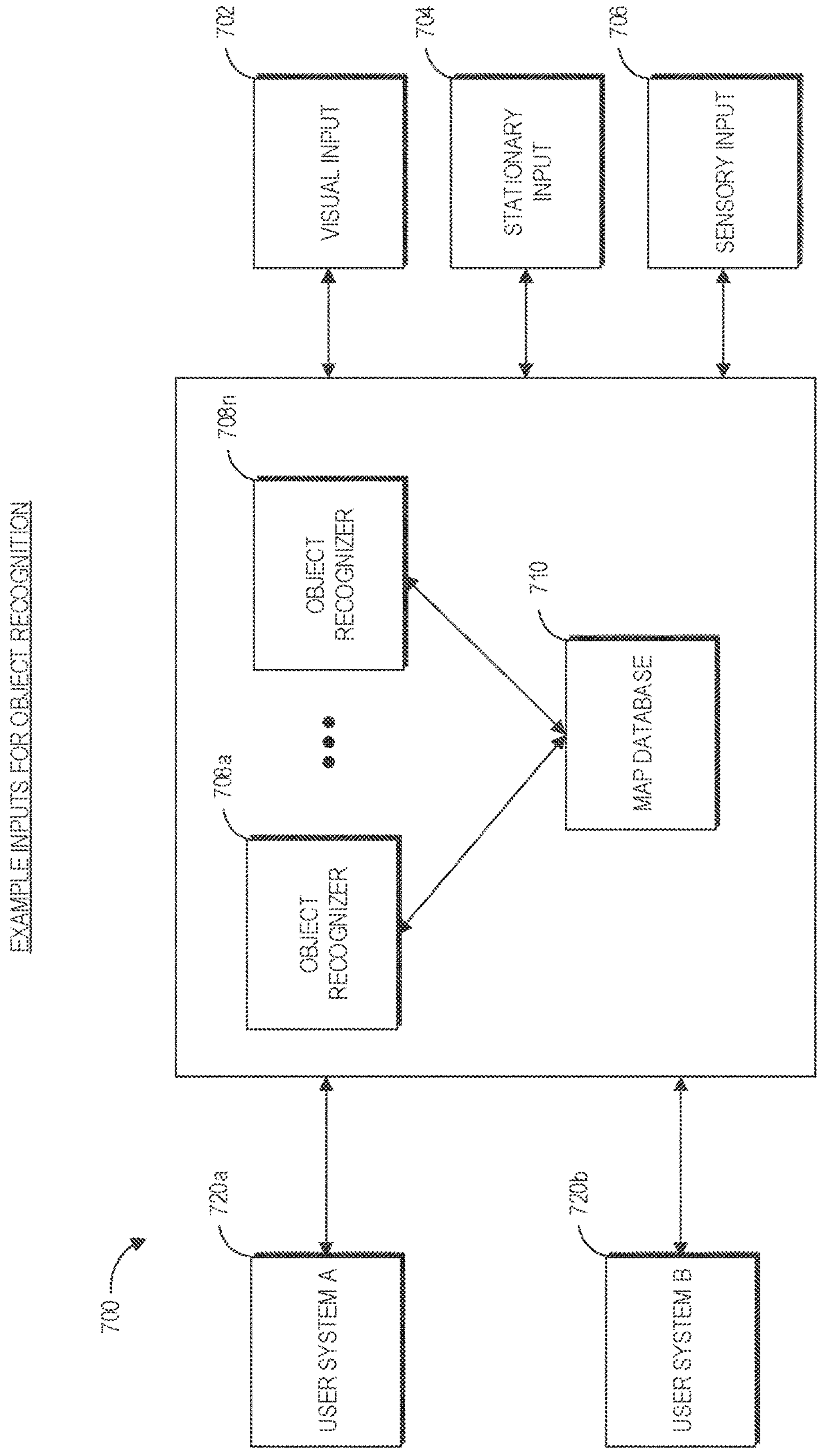
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708*a* to 708*n* may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for objects with certain characteristics. For example, the object recognizer 708*a* may be used to recognizer faces, while another object recognizer may be used to recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Hom-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708*a* to 708*n* may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
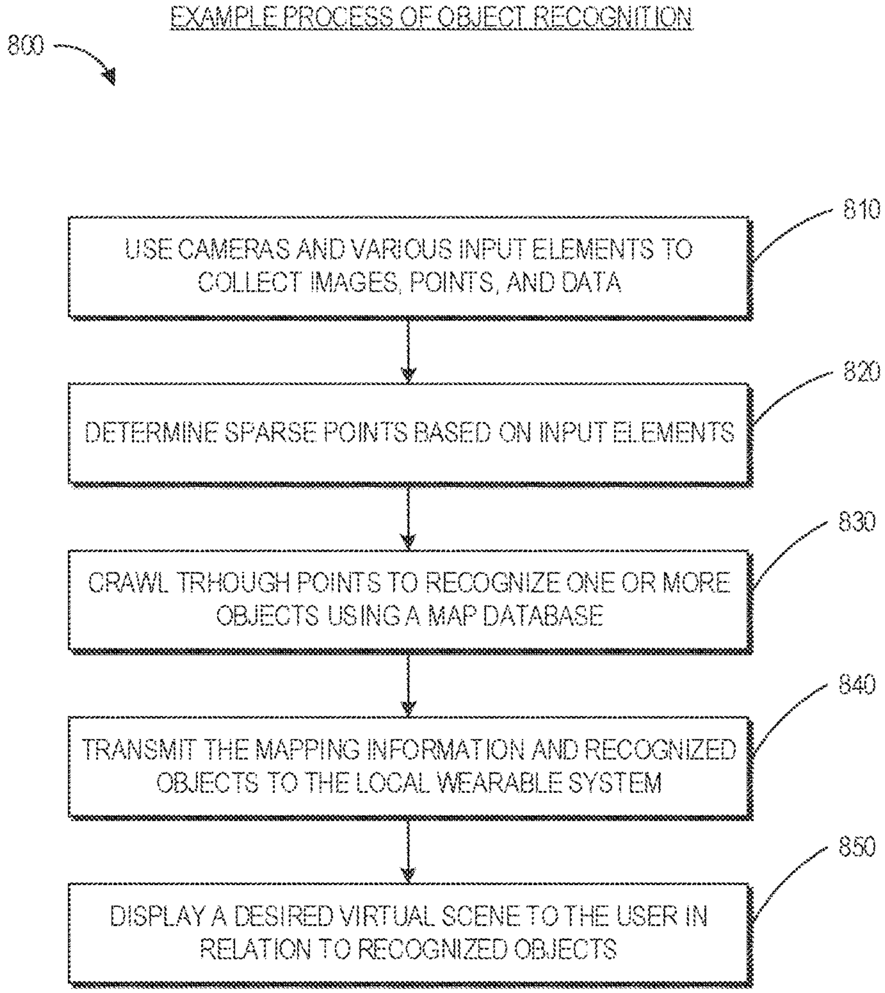
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708*a*-708*n* may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9A:
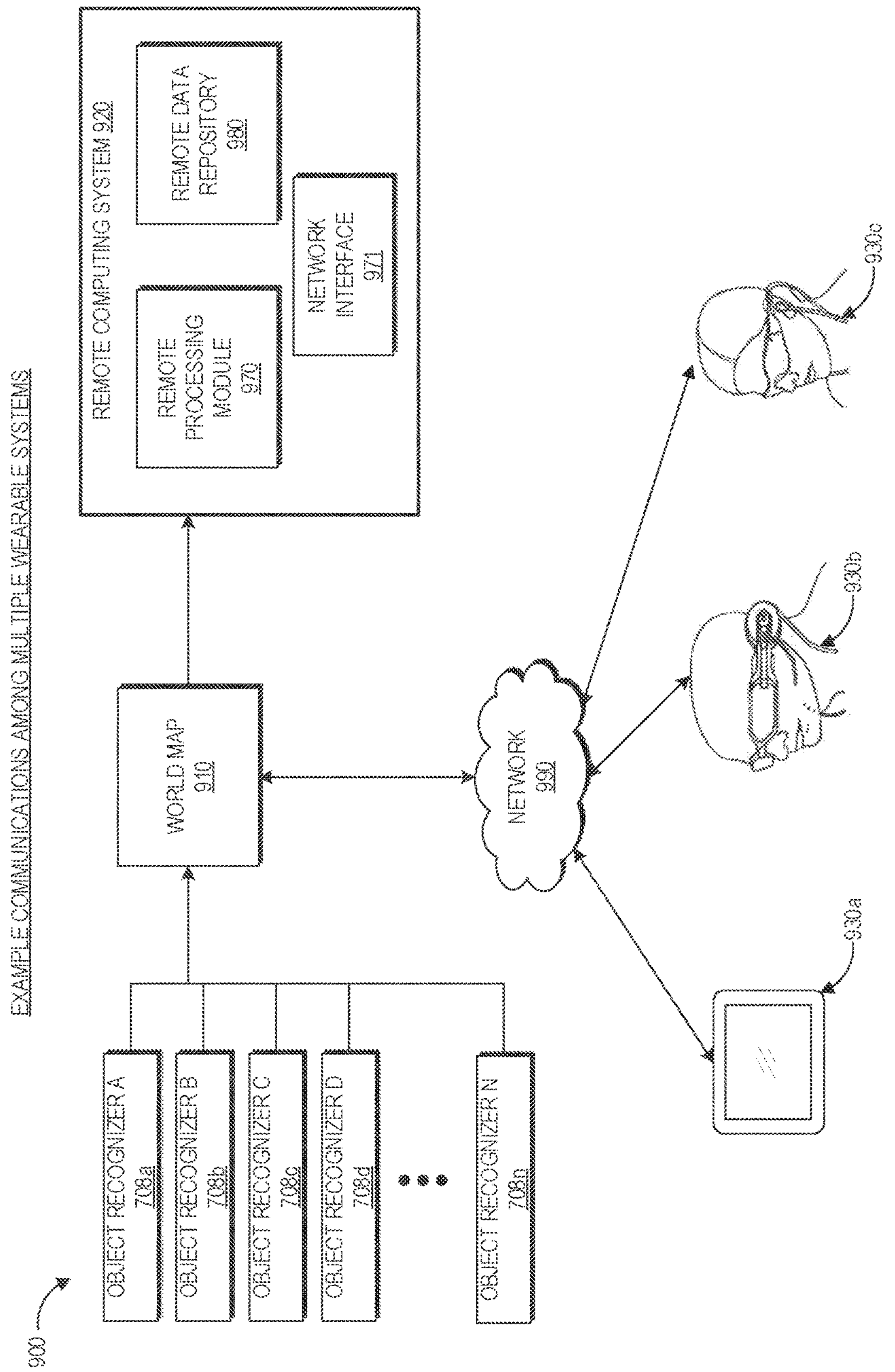
FIG. 9A schematically illustrates an overall system view depicting multiple wearable systems interacting with each other.

FIG. 9A schematically illustrates an overall system view depicting multiple user devices interacting with each other. The computing environment 900 includes user devices 930*a*, 930*b*, 930*c*. The user devices 930*a*, 930*b*, and 930*c* can communicate with each other through a network 990. The user devices 930*a*-930*c* can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930*a*, 930*b*, and 930*c* may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930*a*, 930*b*, 930*c*) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930*b* and 930*c* may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708*a*, 708*b*, 708*c* . . . 708*n*) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930*a*, 930*b*, 930*c*) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930*a*, 930*b*, 930*c*) to process information about the user and the user's environment. The remote computing system 920 can modify the information acquired by the user devices (e.g. 930*a*, 930*b*, 930*c*), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

Figure 9B:
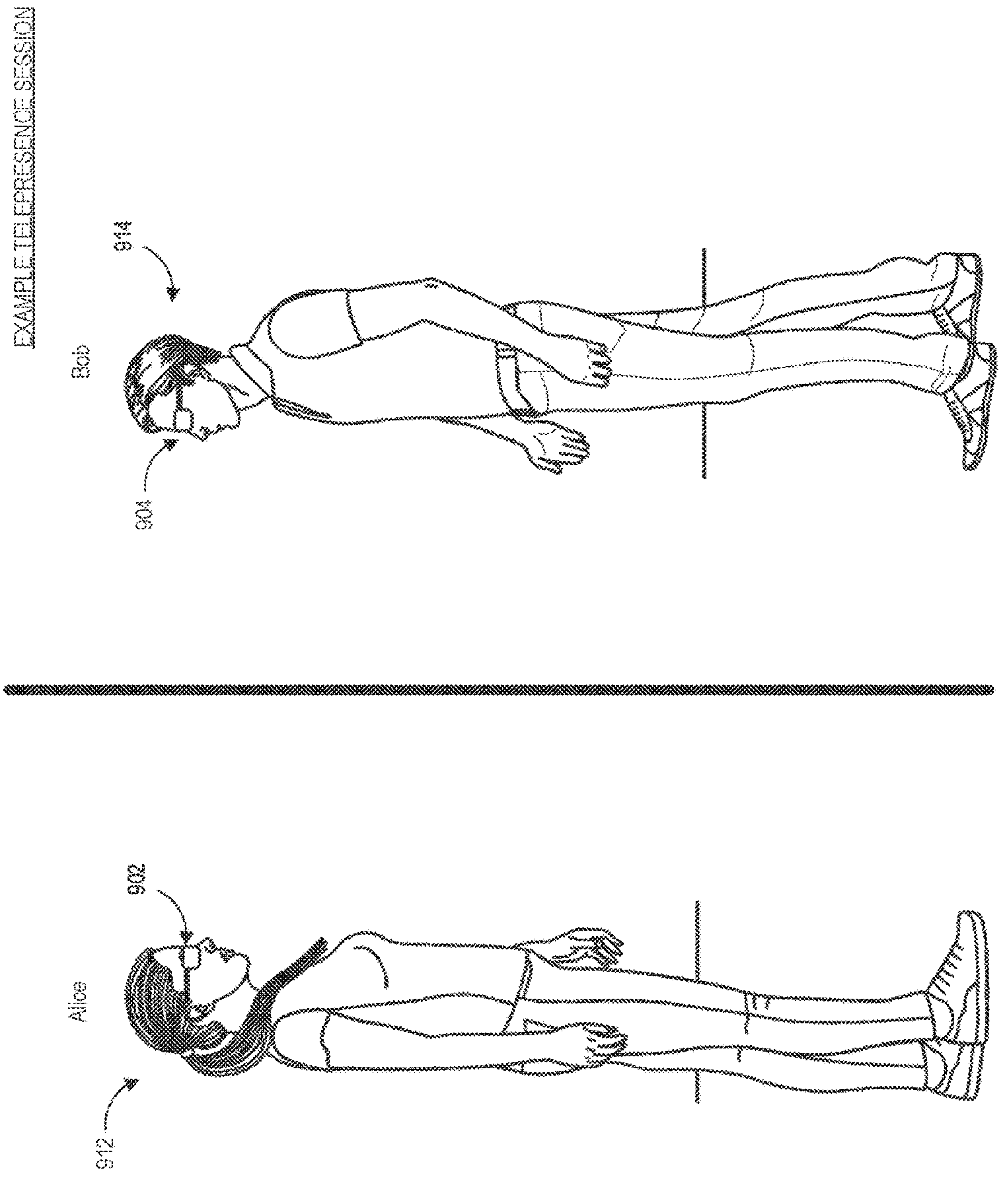
FIG. 9B illustrates an example telepresence session.

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

Figure 10:
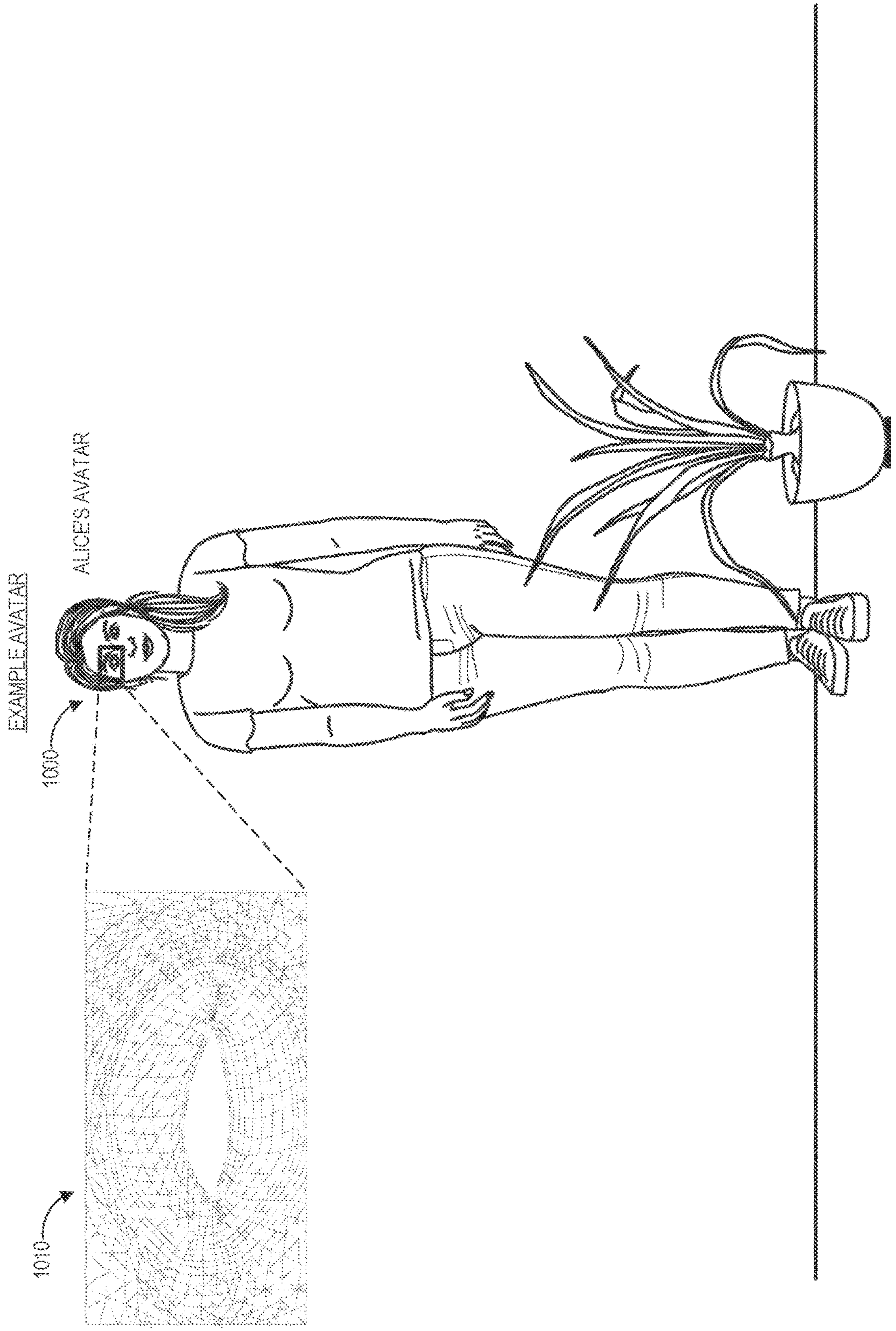
FIG. 10 illustrates an example of an avatar as perceived by a user of a wearable system.

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may be collinear, in which case the polygon has zero area (referred to as a degenerate polygon).

In some embodiments, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging, such as, e.g., by converting from unstructured point cloud data to rig data or by converting from one rig data to another rig data.

The rigging for a virtual character can use skeletal systems to assist with mesh deformations. A skeletal system includes a collection of joints which correspond to points of articulation for the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints-which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which only includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between O (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are averaged in proportion to the respective weights assigned to that vertex for each of the joints. There are well known limitations to LBS in practice, and much of the work in making high-quality rigs is devoted to finding and overcoming these limitations. Many helper joint systems are designed specifically for this purpose.

In addition to skeletal systems, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount and direction of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes m combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBFs). RBFs can perform a machine-learned mathematical approximation of a function. RBFs can be trained using a set of inputs and their associated expected outputs. The training data could be, for example, multiple sets of joint transforms (which define particular poses) and the corresponding blendshapes to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

The goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR system 200, while making as few compromises to the final quality as possible. In some embodiments, the 3D model processing system 680 executes a rigging system to animate an avatar in a mixed reality environment 100 in real-time to be interactive (with users of the VR/AR/MR system) and to provide appropriate, contextual avatar behavior (e.g., intent-based behavior) in the user's environment.

Facial Action Coding System (FACS)

The Facial Action Coding System (FACS) is a system for measuring facial expressions or determining an emotional state based on the appearance of a person's face. FACS is a convenient tool for describing all observable facial movement because it breaks down facial expressions into individual components of muscle movement. Each of the components of muscle movement of FACS is associated with a numerical representation (referred to as an Action Unit (AU)). FACS utilizes approximately 46 basic AUs (approximately 100 AUs in total). Examples of various AUs are provided in Table 1, below.

TABLE 1

| Example FACS AUs |
|---|
| 0: Neutral face |
| 1: Inner Brow Raiser |
| 2: Outer Brow Raiser |
| 4: Brow Lowerer |
| 5: Upper Lid Raiser |
| 6: Cheek Raiser |
| 7: Lid Tightener |
| 8: Lips Toward Each Other |
| 9: Nose Wrinkler |
| 10: Upper Lip Raiser |
| 11: Nasolabial Deepener |
| 12: Lip Corner Puller |
| 13: Sharp Lip Puller |
| 14: Dimpler |
| 15: Lip Corner Depressor |
| 16: Lower Lip Depressor |
| 17: Chin Raiser |
| 18: Lip Pucker |
| 19: Tongue Out |
| 20: Lip stretcher |
| 21: Neck Tightener |
| 22: Lip Funneler |
| 23: Lip Tightener |
| 24: Lip Pressor |
| 25: Lips part |
| 26: Jaw Drop |
| 27: Mouth Stretch |
| 28: Lip Suck |
| 29: Jaw Thrust |
| 30: Jaw Sideways |
| 31: Jaw Clencher |
| 32: Lip Bite |
| 33: Cheek Blow |
| 34: Cheek Puff |
| 35: Cheek Suck |
| 36: Tongue Bulge |
| 37: Lip Wipe |
| 38: Nostril Dilator |
| 39: Nostril Compressor |
| 40: Sniff |
| 41: Lid Droop |
| 42: Slit |
| 43: Eyes Closed |
| 44: Squint |
| 45: Blink |
| 46: Wink |

Using FACS, nearly any anatomically possible facial expression can be coded by deconstructing the facial expression into specific AUs that produced the expression.

Facial expressions are often made up of combinations of AUs such that certain combined movements of these facial muscles (e.g., combined AUs) can represent a particular emotion. For example, a code combination of AU6 and AU12 together might represent a sincere and involuntary smile (e.g., happiness). Further, FACS recognizes differing levels of intensity by appending letters A-E (for minimum-maximum intensity) to the AU number (e.g. AU IA is the weakest trace of AU I and AU IE is the maximum intensity possible for the individual person).

Although FACS is a convenient and widely-use approach to categorizing facial movements, the avatar animation techniques described herein are not limited to the FACS approach. In other embodiments, other public or proprietary facial coding systems can be used to characterize avatar facial movements or to order subregions of the face for iterative analysis by the Facial Solver.

Example Difficulties in Creating High Fidelity Avatar

Traditionally, creation of a high fidelity digital avatar can take many weeks or months of work by a specialized team and can utilize a large number of high quality digitized photographic scans of the human model. However, in many cases, there may be insufficient time to perform massive mathematical computations to achieve highly realistic animation effects, particularly for AR/MR/VR systems where many different subjects (which may include users of the AR/MR/VR system) may want to have their facial poses digitized and used for avatar animation. Accordingly, various approaches have been used to reduce the time and effort required to create a high-fidelity avatar.

Given their cohesive nature, it is a common tendency to want to solve for all the parameters for the subject's entire face simultaneously. However, fitting a model with many parameters at each iteration when performing error minimization often results in overfitting. Overfitting happens when a model's inputs are excessively complex, such as having too many parameters to be fit to the data. Overfitting has poor predictive and computational performance, and may become sensitive to minor fluctuations in the input training data. The undesirable variance of the output from overfitting may manifest as high frequency artifacts commonly referred to as popping.

Figure 11:
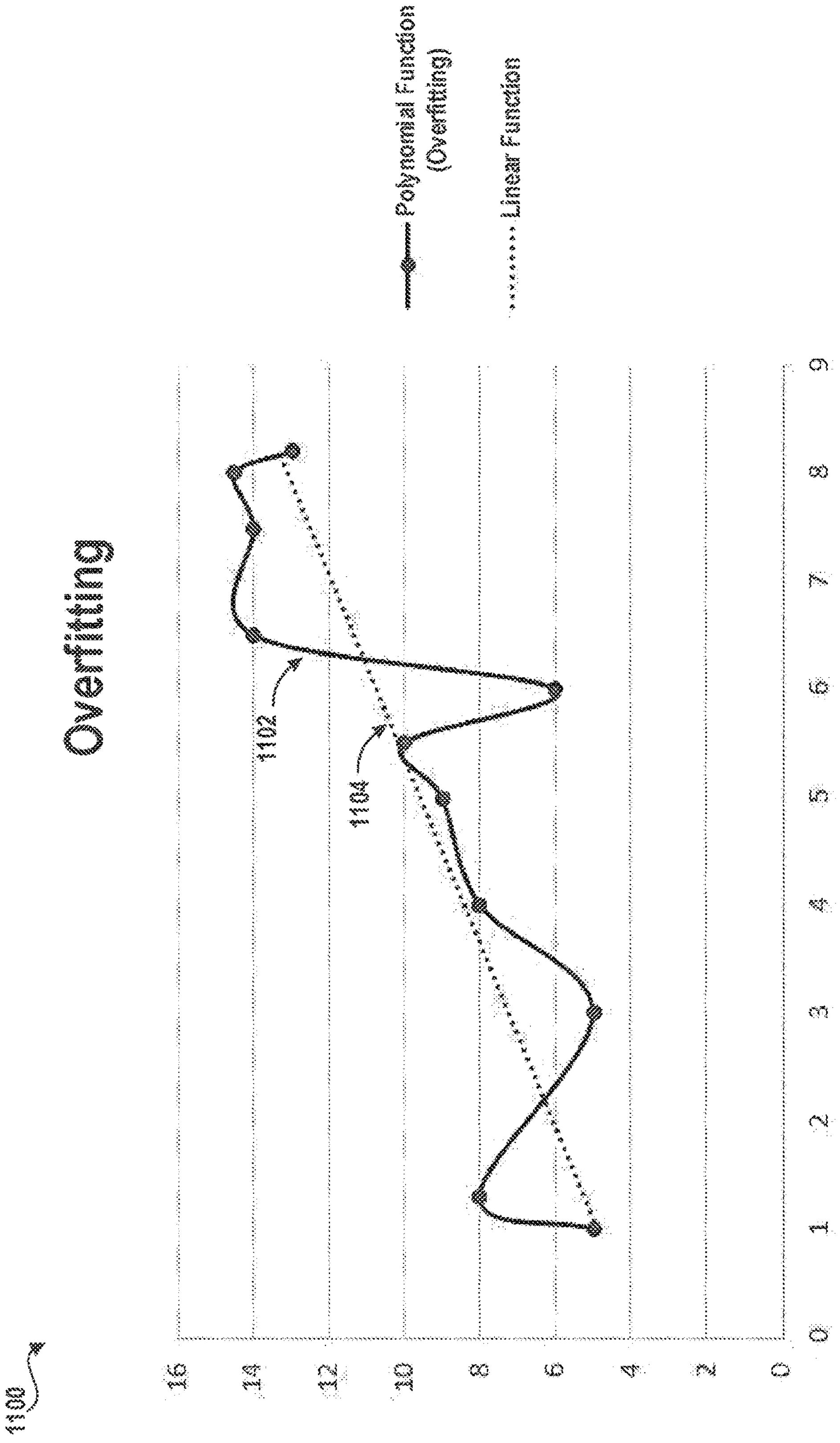
FIG. 11 illustrates an example of overfitting data.

FIG. 11 illustrates an example of overfitting data. Here, graph 1100 includes line 1102 representing the overfitting and line 1104 representing a straight-line best fit to data (represented by the points in the graph 1100). As illustrated, noisy, yet roughly linear, data is fitted to a linear function and a nonlinear, polynomial function. Although the polynomial function (e.g., corresponding to the line 1102) is a nearly perfect fit to the data points, the linear function (e.g., corresponding to line 1104) can be expected to represent the upward trend in the data better. In other words, if the two functions were used to extrapolate beyond the fit data, the linear function (e.g., line 1104) would make better predictions than the polynomial fit 1102. Accordingly, one challenge to fitting a facial model to a subject image is for the system to provide improved or optimal results that quantitatively possess a low error (e.g., an L2 (Euclidean) norm) without overfitting.

In some cases, the Facial Solver system can implement scalar minimization to reduce a computational load and avoid overfitting. That is, the system can reduce a number of points to be matched between an image of a person and the avatar. For example, instead of 125 points, the system may attempt to match 50 points or even 30 points, which would allow the system to compute all of the parameters simultaneously without overfitting. However, scalar minimization generally results in a coarser resolution basis and lower fidelity. As a consequence, several expressions that appear different in the input images, may appear the same when converted to the avatar rig.

Alternatively, some systems can utilize manual input. That is, an animator hand-manipulates an output to fix problems that occur during automated processing. Similarly, the system could re-project a two-dimensional (2D) set of features onto a coarser version of the avatar to make the avatar seem higher fidelity. In other words, the system may solve a less complex equation for geometric space, and supplement the geometry with a second dataset in 2D space for texture. However, this still may result in a low fidelity representation of the avatar.

For other approaches, a system may use a point-to-point correspondence between a subject and an avatar, without the extra step of converting to rig values. However, such a method will typically not produce a high fidelity output because expressions start to blur together and fidelity of translation may be reduced. Further, software tracking of points does not generally produce a high fidelity output without requiring an increase in execution time and complexity, or a reduction of power on the device. For example, every time the system executes a point-to-point correspondence, at least the primary facial expressions would have to be annotated (to make the method run smoother) and the system would also have to calibrate between the avatar face and the subject face, which increases complexity and/or human intervention.

Still, some approaches track 2D feature points on a user's face and infer 3D blendshape parameter data from the 2D feature locations. Such approaches require a calibration from the user that can be confusing, as well as lengthy to set up. In addition, the inferences from the 2D feature points result in reduced precision and fidelity, often resulting in a rendering of lower quality or lower fidelity interpretations of the input emotional state.

Embodiments of the Facial Solver described herein address some or all of these challenges and difficulties.

Example Facial Solver

As described above, the Facial Action Coding System (FACS) classifies observable facial expressions based on the appearance of a person's face by decomposing the facial expressions into isolated muscle contractions or relaxations (see, e.g., Table 1). Each isolated muscle contraction or relaxation of FACS is associated with a numerical representation, referred to as an Action Unit (AU). However, FACS fails to effectively relate the underlying anatomy of the face. Accordingly, embodiments disclosed herein incorporate the FACS taxonomy into a methodology used by a Facial Solver that separates facial expressions into a plurality of facial subregions using fixed boundaries. Any number of facial subregions may be used, for example, 2, 3, 4, 5, 6, 8, 10, 11, 14, 20, 25, 30, or more subregions. The Facial Solver then successively solves (e.g., by reducing or minimizing an error metric between the subject's image data and the avatar rig parameters) for each facial subregion until all facial rig parameters are calculated for the entire face, thereby quickly and efficiently determining rig parameters that define a specific facial expression (e.g., pose). By solving for each facial subregion in turn, rather than solving for all facial subregions simultaneously, the Facial Solver can reduce overall computation time. In addition, by solving the facial rig parameters in an ordered group (e.g., based on facial anatomy), the results of the Facial Solver are more biologically motivated than previous avatar creation efforts.

The Facial Solver can access an image of a human subject and can convert the image into a high fidelity digital avatar using facial mapping techniques that successively solve for subregions of the face subregion, rather than solving for the entire face simultaneously. For example, the facial subregions can be solved for in the order of highest to lowest impact on fundamental facial movements (e.g., largest to smallest movements or gross to fine movement). For each facial subregion, the disclosed Facial Solver can perform a minimization operation that adjusts various facial rig parameters of the particular facial subregion to reduce an error metric between the image and the facial rig parameters of the particular facial subregion. In some implementations, the order of the solution for the subregions proceeds from the jaw subregion, to the lower face subregion, to the funneler subregion, to the lips, to the upper face, to the eyelids, to the eyes, to the neck, and then to extras for the lips, to the tongue, and to miscellaneous fine scale structures of the face.

Each of the facial subregions can correspond to a combination of one or more body parts. It can be advantageous if the system divides a face into a sufficient number of facial subregions. If there is too much subdivision (e.g., too many facial subregions), key relationships between parts may be lost and accuracy of the avatar may decrease. In contrast, if there is not enough subdivision (e.g., too few facial subregions), calculation may take longer and popping from frame to frame may occur (e.g., overfitting), which can lead to lower accuracy. Any number of facial subregions may be used. For example, 8, 10, 11, 12, 13, 14, 15, 16, or more subregions may be used. For example, the facial subregions can include: a jaw subregion, a lower face subregion, a lips subregion, a funneler subregion, an upper face subregion, an eyelids subregion, an eyes subregion, a neck subregion, a lips subregion, a tongue subregion, and a miscellaneous subregion (e.g., comprising temple veins, chin lines, small ear or cheek movements, etc.).

As described herein, the Facial Solver converts a first set of data to a second set of data. In various cases, the first set of data can be different from the second set of data. For example, the first set of data can be unstructured point cloud data representing the subject performing a pose, and the second set of data can be rig data used for animating an avatar to perform the pose. However, the first set of data need not be limited to unstructured data. Rather, the first set of data can be any data that is different or disparate from the second set of data. Disparate can refer to being different in kind or allowing little to no comparison. For example, even when moving from first rig data to second rig data, the first rig data may appear unstructured to the second rig, because the data are not the same. Furthermore, not all rigs have the same number of vertices or the same vertex identifications (IDs), which increases a likelihood that there may be little or no topological relationship between rigs. Thus, embodiments quickly and accurately correlate disparate data using mechanics-motivated and Solver-ordered groupings of parameters.

Considerable diagnostics, both quantitative and qualitative, have been evaluated for embodiments of a Facial Solver, and it has been found that the use of a FACS taxonomy of fixed boundaries that are biologically ordered outperforms a typical scalar minimization scheme for the entire face. Advantageously, the results of the parameter minimization are more biologically motivated and free from local minima artifacts. Accordingly, embodiments of the disclosed technology have the capability of creating high quality or high fidelity avatars (or digital representations in general) for any human user. In order to accomplish this, embodiments of the disclosed process are faster and less resource intense while still maintaining an accurate output.

In any of the techniques, rig data can be for the face or body of an avatar, which can represent a human or another creature, or any object that moves or deforms. Any of the embodiments of the Facial Solver described herein may be implemented and performed by the avatar processing and rendering system 690 described with reference to FIG. 6B, for example, by the 3D model processing system 680. Further, although the Facial Solver may be described as minimizing an error metric, this is intended to include reducing the error metric to a reasonably small value, or iterating for a sufficient number of iterations, so that the final error metric is smaller than the initial error metric. Accordingly, in a minimization operation, a mathematically exact local or global minimum is not required to be achieved or found by the Facial Solver. Furthermore, although the Solver is generally referred to as a Facial Solver, the same or similar techniques or methods described herein may be applied to other portions of a user's body (for example, feet, hands, arms, legs, chest, shoulders, neck, back, ears, hips, or the like) or may be applied to one or more or deformable virtual objects.

Example Facial Rig Details

As described herein, FACS decomposes facial expressions into isolated muscle contractions or relaxations of facial movement, and each isolated muscle contraction or relaxation is associated with a numerical representation, referred to as an Action Unit (AU). Thus, the FACS coding system utilizes AUs to numerically categorize facial muscle contractions or relaxations. Leveraging machine-learning principles, embodiments of the system are able to transfer the facial performance from an arbitrary temporal point cloud to a representational avatar facial rig.

Figure 12:
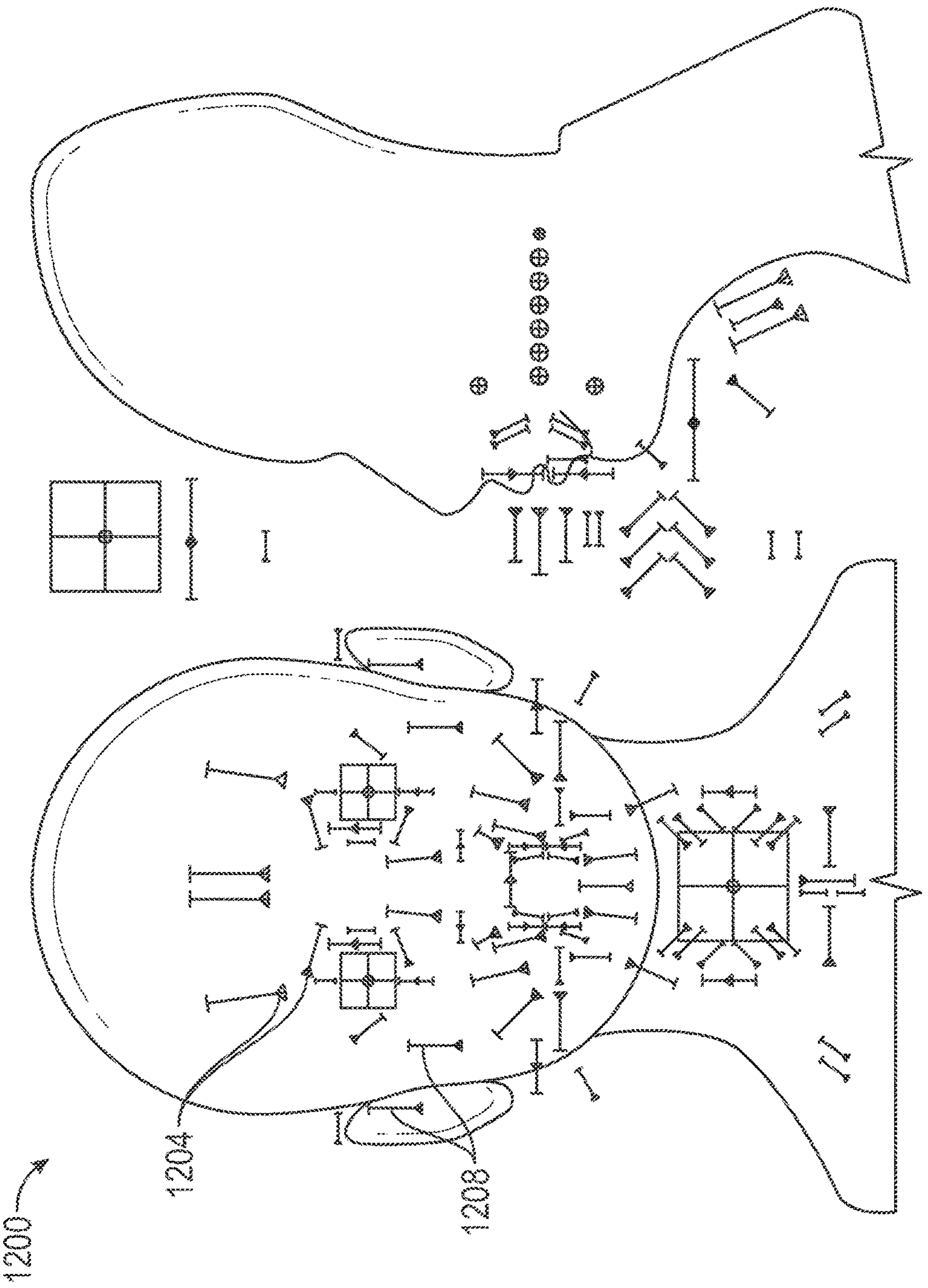
FIG. 12 schematically illustrates an example of a facial action coding system (FACS) rig.

FIG. 12 schematically illustrates an example of a facial rig 1200 that can be used to animate an avatar in an AR/VR/MR system. The facial rig 1200 can be thought of as a digital puppet in which points of articulation are parameterized into a plurality of facial rig parameters 1204, 1208. The facial rig 1200 electronically adjusts values for the points of articulation to generate a desired facial expression or emotion of the avatar. The facial rig parameters 1204, 1208 can be directly mapped to AUs of the FACS characterization of the human face. For example, arrows 1204 correspond to an AU parameter and lines 1208 indicate the directionality of the AUs. The facial rig parameters 1204, 1208 can be adjusted to control the deformation of the digital puppet 1200.

The controls (e.g., facial rig parameters 1204, 1208) can be driven in real time by the facial rig and can be parameterized to a normalized value, such as between −1 and 1 or between 0 and 1. By normalizing the controls, the values can be used from rig to rig. For example, if a FACS session is performed for a human model, the system can advantageously re-use that data on another person.

As described above, combinations of the AUs can aggregate to form representations of emotional states of the human face (sometimes referred to as AU variants). Further, an intensity scale (e.g., between 0% and 100%) may be included for each AU of the AU variant. For example, the expression "Happy" can correspond to AUs: 12 (lip corner puller) (100%), 25 (lips apart) (100%), and 6 (Cheek Raiser) (51%). In some cases, if the intensity is not specified, the intensity will be set at a default value (e.g., 100%). For example, in some cases, "Happy" can be represented as the AU variant [12, 25, 6 (51%)].

Various other expressions can also be represented, including, but not limited to, sad, fearful, angry, surprised, or disgusted. For example, the expression "Sad" can correspond to AUs: 4 (Brow Lowerer) (100%), 15 (Lip Corner Depressor) (100%), I (Inner Brow Raiser) (60%), 6 (Cheek Raiser) (50%), 11 (Nasolabial Deepener) (26%), and 17 (Chin Raiser) (67%). Thus, "Sad" can be represented as AU variant [4, 15, I (60%), 6 (50%), 11 (26%), 17 (67%)]. The expression "Fearful" can correspond to AUs: 1 (Inner Brow Raiser) (100%), 4 (Brow Lowerer) (100%), 20 (Lip stretcher) (100%), 25 (Lips part) (100%), 2 (Outer Brow Raiser) (57%), 5 (Upper Lid Raiser) (63%), 26 (Jaw Drop) (33%). Thus, "Fearful" can be represented as AU variant [1, 4, 20, 25, 2 (57%), 5 (63%), 26 (33%)]. The expression "Angry" can correspond to AUs: 4 (Brow Lowerer) (100%), 7 (Lid Tightener) (100%), 24 (Lip Pressor) (100%), 10 (Upper Lip Raiser) (26%), 17 (Chin Raiser) (52%), 23 (Lip Tightener) (29%). Thus, "Angry" can be represented as AU variant [4, 7, 24, 10 (26%), 17 (52%), 23 (29%)]. The expression "Surprised" can correspond to AUs: 1 (Inner Brow Raiser) (100%), 2 (Outer Brow Raiser) (100%), 25 (Lips part) (100%), 26 (Jaw Drop) (100%), 5 (Upper Lid Raiser) (66%). Thus, "Surprised" can be represented as AU variant [I, 2, 25, 26, 5 (66%)]. The expression "Disgusted" can correspond to AUs: 9 (Nose Wrinkler) (100%), 10 (Upper Lip Raiser) (100%), 17 (Chin Raiser) (100%), 4 (Brow Lowerer) (31%), 24 (Lip Pressor) (26%). Thus, "Disgusted" can be represented as AU variant [9, 10, 17, 4

(31%), 24 (26%)]. Accordingly, by knowing the AUs and/or AU variants used for a particular animation, the Facial Solver can identify one or more emotions associated with that set of AUs and/or AU variants.

Although many of the AU variants may be based on FACS, some expressions may be different from traditional FACS groupings. For example, the disclosed FACS rig system may utilize different AUs or different intensity scales to represent an emotion. Accordingly, the facial rig parameters 1204, 1208 can be coarsely mapped in real time. For example, if a real person smiles, the Facial Solver may interpret this as happy, and the person's avatar can be manipulated as a "happy" category (rather than point-to-point matching of the real person). This may simplify the computational load of the system.

Examples of Facial Subregions and Boundaries

The Facial Solver can iteratively calculate a correspondence between Data 1 (e.g., input data) to Data 2 (e.g., rig data) by iteratively minimizing an error metric over an ordered set of subregions. In many cases, the minimizations of the subregions work in a sequence that is mutually constitutive. For example, the minimizations for different subregions generally do not execute simultaneously. Instead, the results for the minimization for one subregion can feed as input into the minimization for another subregion using a particular ordered sequence of the subregions. The ordering of the sequence of the subregions may be referred to as the "Solver Order."

As described herein, the Solver Order typically begins with a large subregion and moves to progressively smaller subregions until the entire region has been solved. For example, a large subregion can correspond to a large area of movement, such as the jaw, or can correspond to a region that includes more facial muscles than other regions. In contrast, a small subregion can correspond to a smaller region than a large region and may represent more granular details, such as the eyes, or can correspond to a region that includes fewer facial muscles than other regions. In other implementations, a large subregion may have a larger surface area (e.g., greater than 50 to 100 cm2) than a small subregion (e.g., less than 10 to 20 cm2), and the Solver Order may rank the subregions by their respective surface areas (with subregions having larger surface area processed first, proceeding to subregions having progressively smaller surface area).

In other implementations, the ordering of subregions in the Solver Order can be based on a measure of the magnitude of deformation vectors in each of the subregions. For example, if the magnitude of the set of vectors is large (e.g., representing larger facial movements) then the corresponding region would be processed earlier in the Solver Order than a subregion having a smaller magnitude (e.g., representing smaller facial movements). As an example, if the magnitudes of the deformation vectors from the jaw subregion are largest, then the jaw subregion would be classified as the first item in the Solver Order. If the rotation of the eyeball produces the lowest magnitudes of the deformation vectors, then the eyeball region would be classified as the final subregion in the Solver Order. Thus, vector fields or flow fields representing the facial deformation can be used to train or classify an ordered set of subregions for the Facial Solver.

In some embodiments, the Facial Solver can begin with rig settings in a neutral position, which can include a starting rig expression of the subject. The starting rig expression can be referred to as a default rig and/or a neutral rig. For example, the starting rig expression can include a neutral expression in which all AUs are set to zero and/or all intensities are set to zero. Alternatively, the starting rig expression can include the settings for a previously determined facial rig (e.g., for one or more subregions previously solved for in the Solver Order). The Facial Solver executes a minimization operation which iteratively adjusts the FACS controls of a corresponding facial subregion to reduce or minimize an error metric between the input image and the particular facial subregion of the facial rig. Further, the output of one iteration can be the input of the next iteration. In this way, each iteration builds on itself and no iteration will be calculated using the same data. The minimization operation for the subregion can terminate when a termination criterion is satisfied. For example, the termination criterion can be satisfied if the iteration executes a maximum allowed number of iterations (e.g., 50 iterations). In addition or alternatively, the termination criterion can be satisfied when the error metric (e.g., an L2 norm or a Hausdorff distance, as described below) is less than an error threshold (e.g., 0.01, 0.001, 0.0001), thereby indicating there is an acceptable match between the input image and the facial rig for that particular subregion.

This process is repeated for each subsequent subregion, until all of the facial subregion in the Solver Order have been solved for. As described above, the results for one subregion can be used as the initial guess for the next subregion in the Solver Order. Thus, each subsequent facial subregion may be easier to calculate, because only a portion of the input image remains unsolved or unknown. Once all facial subregions have been solved for, the system sets the facial rig (e.g., AU) parameters as the output of the Facial Solver. The facial rig parameters can be stored in non-transitory computer storage (e.g., non-volatile memory, optical, magnetic, or semiconductor storage).

A key frame in animation and filmmaking is a drawing that defines the starting and ending points of any smooth transition. The drawings are called "frames" because their position in time is measured in frames on a strip of film. The facial rig parameters determined by the Facial Solver can be set as a frame or a key frame in an animation sequence.

In various implementations, subregions of the face are not only based on FACS, but are also based on biology (e.g., anatomy) of the face. For example, although FACS may have some groupings (such as groups corresponding to the eyes or brow subregion), the disclosed subregions can be based on the FACS groups but with modifications related to underlying anatomy. For example, the Facial Solver can include one or more subregions for one or more of a person's jaw, lower face, lips, upper face, eyelids, eyes, neck, lips, or tongue. In addition, the Facial Solver can include a subregion for a shape called the funneler. The funneler shape is within the lower face after the jaw moves but before the lips move.

Figure 13:
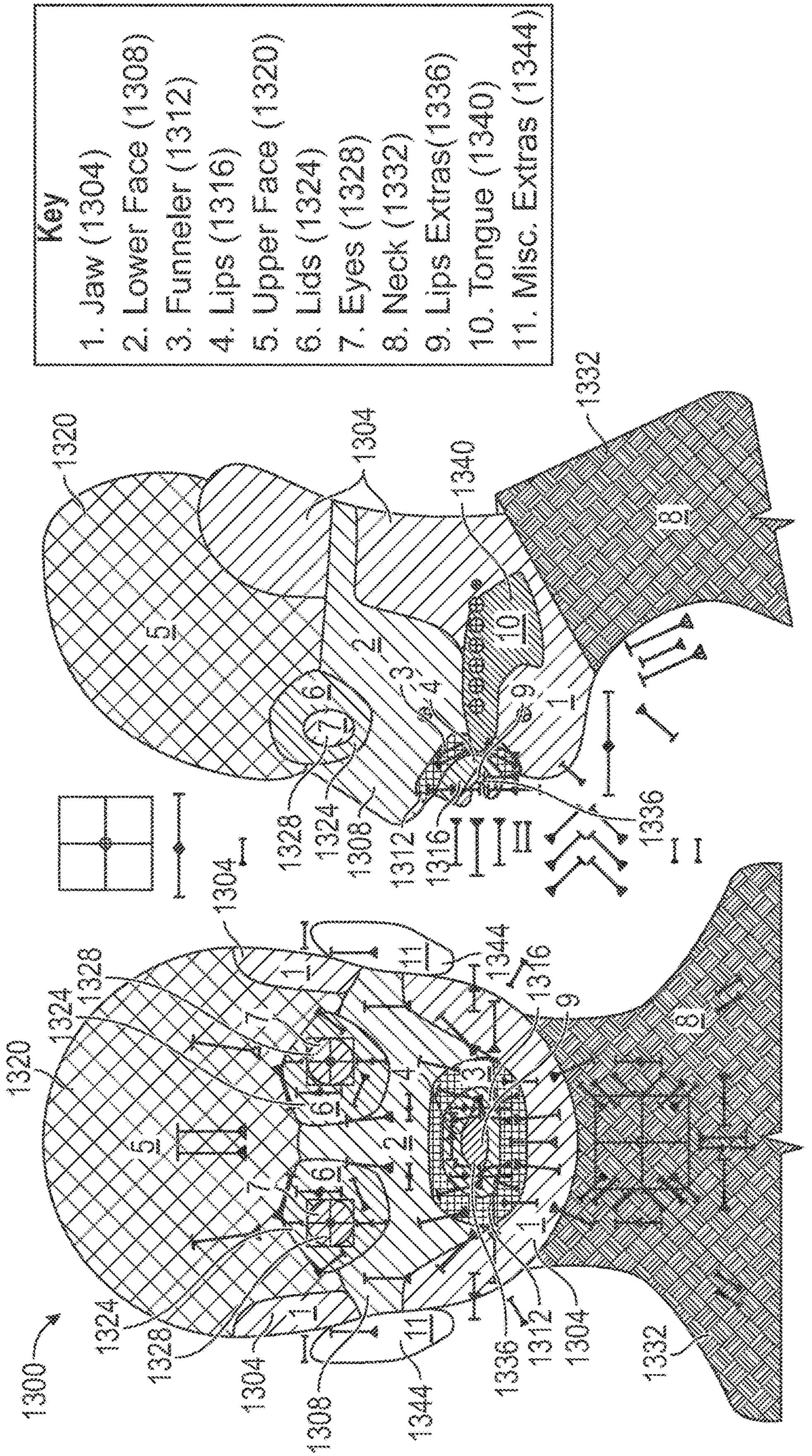
FIG. 13 schematically illustrates an example of a facial rig with overlaid facial subregions. The Key provides an example of a Solver Order based on these example facial subregions.

FIG. 13 schematically illustrates example facial subregions and boundaries overlaid on the FACS rig of FIG. 12. The different facial subregions are colored differently in FIG. 13 (e.g., the jaw subregion 1304 is colored red, and the neck subregion is colored purple). Each subregion includes a collection of FACS parameters (e.g., AUs 1204 and AU directionalities 1208) of the facial rig. The results of each subregion feed into another subregion in the Solver Order. It is this process of hierarchically compounding the results of each subregion and feeding into the next subregion that allows the Facial Solver to achieve a biologically motivated result that is qualitatively, quantitatively, and computationally robust.

Some approaches include a Facial Solver having a Solver Order that is biologically ordered based on an impact of the muscles on the face. For example, in some cases, the sequence of priority in which the subregions are processed by the Facial Solver is shown in Table 2.

TABLE 2

| Solver Order |
|---|
| 1) Jaw |
| 2) Lower Face |
| 3) Lips |
| 4) Funneler |
| 5) Upper Face |
| 6) Lids |
| 7) Eyes |
| 8) Neck |
| 9) Lip Extras |
| 10) Tongue |
| 11) Miscellaneous Extras |

The lower face subregion can comprise the nose and portions of the cheeks above the jaw line. The funneler can comprise a subregion surrounding the lips, above the jaw, and below the lower face subregion. The upper face can comprise the forehead. The final subregion in the example Solver Order, miscellaneous extras, may comprise fine-scale subregions of the face such as temple veins, chin lines, small ear or cheek movements, etc.

In other words, with reference to the example in Table 2 and FIG. 13, first, the Facial Solver executes a minimization operation for the Jaw subregion, which iteratively minimizes an error metric between the jaw in the input image and the jaw subregion 1304 of the facial rig. Next, the Facial Solver executes a minimization operation for the Lower Face, which iteratively minimizes an error metric between the lower face in the input image and the lower face 1308 of the facial rig. The Facial Solver continues to successively apply minimization operations for each of the remaining facial subregions in the Solver Order (e.g., ending with miscellaneous extras) until all facial subregions have been analyzed. The parameters of the facial rig can be stored or used in an animation sequence.

The jaw boundary 1304 can include the jaw's biomechanical parameters in relation to FACS. Because the jaw or mandible subregion is the largest articulating joint structure in the human face, movement of the jaw has the largest impact on the face when considering surface area of the face. Accordingly, the jaw boundary 1304 is closely related to speech and emotion. Therefore, in some cases, the jaw boundary 1304 has the highest priority of the Solver Order, and the jaw parameters are the first to be solved for in the Solver Order (see, e.g., Table 2).

Although the lower face and mouth are both well connected to the jaw, the lower face covers a larger surface area than the mouth. Accordingly, the lower face boundary 1308 may be more closely related to speech and emotion than a mouth boundary (e.g., funneler 1312, lips 1316, lip extras 1336, tongue 1340, etc.). Thus, in some cases, the lower face can be assigned the second priority (e.g., the second subregion to be executed). As described above, when solving for the second subregion, the Facial Solver can receive as input, the output of the results from the solution for the first subregion. Accordingly, in this example, the lower face boundary subregion receives, as input, the output of the jaw boundary solution, and lower face boundary subregion can then be executed to further minimize an error metric between the input image and the facial rig. The Facial Solver can proceed to the next item in the Solver Order, and will repeat this process for all remaining subregions until the entire facial rig is solved.

Subregions in the Solver Order may not only be based on biology, but also may be based on FACS. For example, in some cases, there is a funneler subregion. The funneler can include the lower face after jaw moves but before the lips move. Some implementations use the FACS taxonomy (for example, eyes or brow subregions of the FACS taxonomy). However, in some cases, the subregions are based at least partly on FACS groups (e.g., some or all of the groups listed in Table 1) but with modifications related to underlying anatomy. In other cases, other facial taxonomy systems can be used to determine the facial subregions used in the Solver Order.

Example Facial Solver Variations

In some cases, the Facial Solver can include the same subregions identified above in Table 2 (e.g., Jaw, Lower Face, Lips, Funneler, Upper Face, Lids, Eyes, Neck, Lip Extras, Tongue, and Misc. Extras), but the Solver Order may be different. For example, the Solver Order may flow from largest impact to lower impact, lowest impact to highest impact, largest group to smallest group, smallest group to largest group, or various other combinations. As a non-limiting example, in some cases, a Solver Order can prioritize lips over the jaw. In other words, a Facial Solver can solve for a lips region prior to solving for a jaw region. However, because lips can be the result of jaw movement, a Facial Solver that prioritizes lips over the jaw may be less accurate, more time consuming, and more challenging to implement than a Facial Solver that prioritizes the jaw over the lips. Accordingly, in some cases, the lips can be calculated at any point in the Solver Order, after the jaw. This may have the benefit of improving accuracy or reducing computation time (i.e. the number of iterations required to converge).

In some cases, the Facial Solver can include the same subregions identified above, as well as the same Solver Order, but parameters per subregion are different. For example, in some cases, some of the parameters of the cheek could be in the jaw group. However, this may cause the cheek to take precedence over the jaw and popping may occur. Thus, it may not be advantageous to have a jaw parameter in a cheek subregion, as it might cause the Facial Solver to be less accurate.

In some cases, the Facial Solver has the same Solver Order as identified above and the same subregions, but with one or more of the subregions further divided. For example, the subregions can be divided such that no subregion has more than a particular number (e.g., 5) of parameters. However, in some cases, the result of this division of subregions may appear disjointed because each of the parameters in the subregions work in conjunction with each other. Consequently, if the subregions are further divided, the avatar might appear jerkier during animation.

For each subregion of the Solver Order, the system can temporally optimize the numerical values for the facial parameters of the facial rig. These parameters may be based on the FACS parameters such as FACS AUs. For example, using the output from a previous subregion as the initial prediction in the next subregion, the system creates a prediction loop. In some cases, this prediction loop can serve to stabilize any high frequency artifacts and maintain a lower computational complexity.

The system may utilize one or more various Facial Solver techniques for improving or optimizing the numerical values for the facial parameters of the facial rig. For example, the system can minimize an error metric (described below) between the input image for a subregion (e.g., as digitally represented by a point cloud or mesh) and the facial rig for that subregion. During the optimization, facial rig parameter values are adjusted so that the error metric is reduced and ultimately converges by meeting a convergence criterion. The convergence criterion can comprise the error metric being reduced to below an error threshold (e.g., 0.001, 0.0001, etc.) or a maximum number of iterations being performed during the optimization (e.g., 50, 75, 100 iterations).

The Facial Solver may be configured to utilize one or more optimization techniques. For example, Constrained Optimization By Linear Approximation (COBYLA) may be utilized, because this technique does not require knowledge of the derivative for the error metric. In addition or alternatively, the system can minimize the error metric using the Nelder-Mead method (sometimes referred to as Simplex), the Levenberg-Marquardt algorithm (sometimes referred to as Least Squares), or the Newton Conjugate Gradient method. In some cases, the Facial Solver defaults to using COBYLA, but if COBYLA does not provide a solution, the system may re-run the Facial Solver with any of the foregoing alternative optimization methods to try to obtain a solution. In some cases, the choice of Facial Solver technique may be user-selectable.

Example Error Metrics

The particular error metric utilized by the Facial Solver can be based at least in part on the properties or characteristics of the input data (e.g., the input image). For example, if there is a topological correspondence (e.g., there is some vertex to vertex matching) between the input data and the facial rig deformations, then the Facial Solver can utilize a Euclidean method to measure the L2 (Euclidean) norm (also known as least squares error (LSE)), for example, using Equation 1, below. In Equation 1, d(X, Y) is the L2 norm between a set of points $X=(x_1, x_2, \ldots, x_n)$ and $Y=(y_1, y_2, \ldots, y_n)$. In the Facial Solver, the point Y may represent the image data in a subregion, and the point X may represent the facial rig data for that subregion. The number n may represent the number of vertices in the rig for the subregion.

$$d(X, Y) = \sqrt{(x_1 - y_1)^2 + (x_2 - y_2)^2 + \ldots + (x_i - y_i)^2 + \ldots + (x_n - y_n)^2} \quad \text{(Equation 1)}$$

There may be a topological correspondence between the input data and rig data when the input data corresponds to mesh input (rather than an unstructured point cloud). This is because the mesh input may be correlated to the facial rig deformations. An example of this can include input data corresponding to real-time user image capture with a webcam.

Further, the system can utilize the Euclidean L2 norm when moving from one rig to a different rig. For instance, a more advanced rig can increase the range of emotions the avatar can express. Thus, instead of starting from scratch, embodiments of the Facial Solver can utilize the Euclidean error metric to convert original rig values to the new rig values. For example, the Euclidean method can measure a distance between a vertex of the input data relative to a vertex of the facial rig.

Although the L2 norm is commonly used as an error metric for optimization problems, other norms can be used such as, e.g., L-p norms (the L2 norm is a sub-case with p=2), a Mahalanobis distance, and so forth.

In contrast, where there is no topological correspondence (e.g., no vertex to vertex matching) between the input data and the facial rig deformations, the Facial Solver can use the Hausdorff distance $d_H$ (e.g., as illustrated in Equation 2 below) as the error metric function. In Equation 2, sup represents the supremum, inf represents the infimum, max represents the maximum, and d(x,y) represents a metric distance. The Hausdorff distance represents the greatest of all the distances from a point in the set X (e.g., the facial rig) to the closest point in the set Y (e.g., the input image data).

$$d_H(X, Y) = \max\left\{ \sup_{x \in X} \inf_{y \in Y} d(x, y), \sup_{y \in Y} \inf_{x \in X} d(x, y) \right\} \quad \text{(Equation 2)}$$

For example, the system can utilize the Hausdorff distance when the input data is unstructured point cloud input. This is because it is not always clear what points in the unstructured point cloud input correlate to points in the facial rig. Using the Hausdorff distance, the system can obtain the closest point on surface (CPOS), and then the system can calculate the Hausdorff distance by doing shape matching in neighborhoods.

Example Facial Solver Implementation

Figure 14:
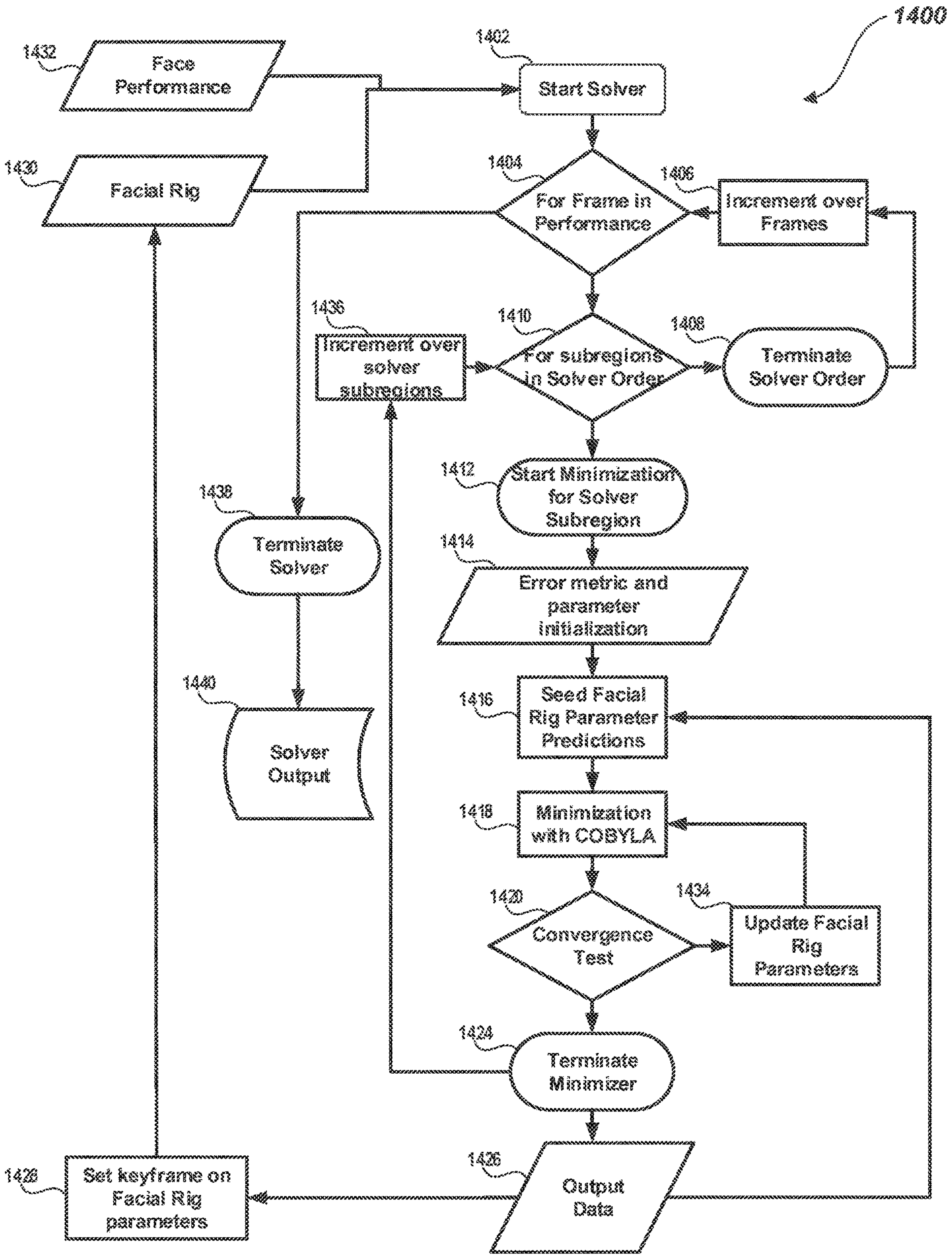
FIG. 14 is a block diagram that illustrates an example Facial Solver process.

FIG. 14 is a block diagram that illustrates an example Facial Solver process 1400 implemented by the system. The process 1400 can be performed and implemented by one or more computing devices or processing systems. For example, the process 1400 can be performed by a computing system associated with a photogrammetric capture stage configured to obtain image scans of the subject or a computing system that is associated with the wearable system 200, such as the avatar processing and rendering system 690 described with reference to FIG. 6B, such as the 3D model processing system 680.

At block 1402, the Facial Solver begins, receiving a face performance input (block 1432). The face performance input (sometimes referred to as a performance capture) can include a temporal sequence of someone performing a pose (e.g. a video of a person going from a neutral expression to a smile). That sequence can be driven in real time after the system solved for that sequence and that sequence is stored on non-transitory computer storage. In some cases, the face performance input includes a plurality of images corresponding to various facial poses of a human subject. For example, the face performance can include a large number of high quality digitized photographic scans of the human subject performing various poses (each pose may be referred to as a frame). The scans may be combined to form a 3D image of the human subject. The face performance input can include one or more frames, such as one or more frames of a video or an image.

For each frame (e.g., facial pose) in the performance (e.g., set of facial poses), the Facial Solver iterates over a plurality of subregions (blocks 1410, 1436), and in each subregion of the face, the Facial Solver iteratively calculates a reduction or a minimum between the frame (e.g., input image) and rig data for that subregion. As described herein, the subregions work in a sequence that is mutually constitutive in that the results of one subregion feed into another subregion. Further, the Facial Solver iterates over the subregions following a particular sequence (e.g., the Solver Order; see the example in Table 2). As the Facial Solver works on a particular subregion, the Facial Solver optimizes the numerical values (e.g., adjusting the facial rig parameter values; blocks 1412, 1414, 1416) of the facial subregion to find a best (or improved) fit to the input image data. For example, the system can perform this optimization by reducing or minimizing an error metric (e.g., an L2 norm or a Hausdorff distance), e.g., via a technique such as COBYLA (see block 1418). The Facial Solver can apply a convergence test (block 1420) to determine if the minimization for a subregion has converged (e.g., the error metric between the facial rig and the input image has decreased below an error threshold or a maximum number of iterations has been reached). If convergence has not been reached, the facial rig parameters are updated (block 1434) and the minimization continues at block 1418. At block 1424, if convergence has been reached for the subregion, the minimizer is terminated, thereby indicating there is an acceptable match between the particular facial subregion and the input image.

At block 1436, the Facial Solver proceeds to the next subregion in the Solver Order. This process is repeated for each subsequent subregion in the Solver Order until the entire frame (e.g., the entire facial region) is analyzed. As described above, the results from one subregion can be fed into the next subregion in the Solver Order. Thus, each subsequent subregion may be easier to calculate because only a portion of the input facial image remains unsolved or unknown.

At block 1426, once all facial subregions for a particular frame have been solved, the system sets the facial rig (e.g., FACS AU) parameters to the output of the Facial Solver and may key frame all facial rig parameters at the current frame in the performance (block 1428) or apply the parameters to the facial rig (block 1430). At block 1406, once a particular frame is solved, the Facial Solver accesses the next frame in the performance (e.g., another image of another pose of a human subject) and repeats the process. The process is repeated for each frame of the face performance until every frame in the face performance is analyzed at which point the Facial Solver is terminated (block 1438) and the Facial Solver output can be stored in non-transitory computer storage (block 1440). An avatar (corresponding to the finalized facial rig) can be stored on any type of non-transitory memory, such as an optical or magnetic hard disk. Thus, instead of running a Facial Solver every time and/or in real time, the system can run the Facial Solver once and store the results. In some cases, the system can label the determined facial rig parameters corresponding to an emotion or an expression (e.g., "happy", "surprised", etc.).

Figure 15:
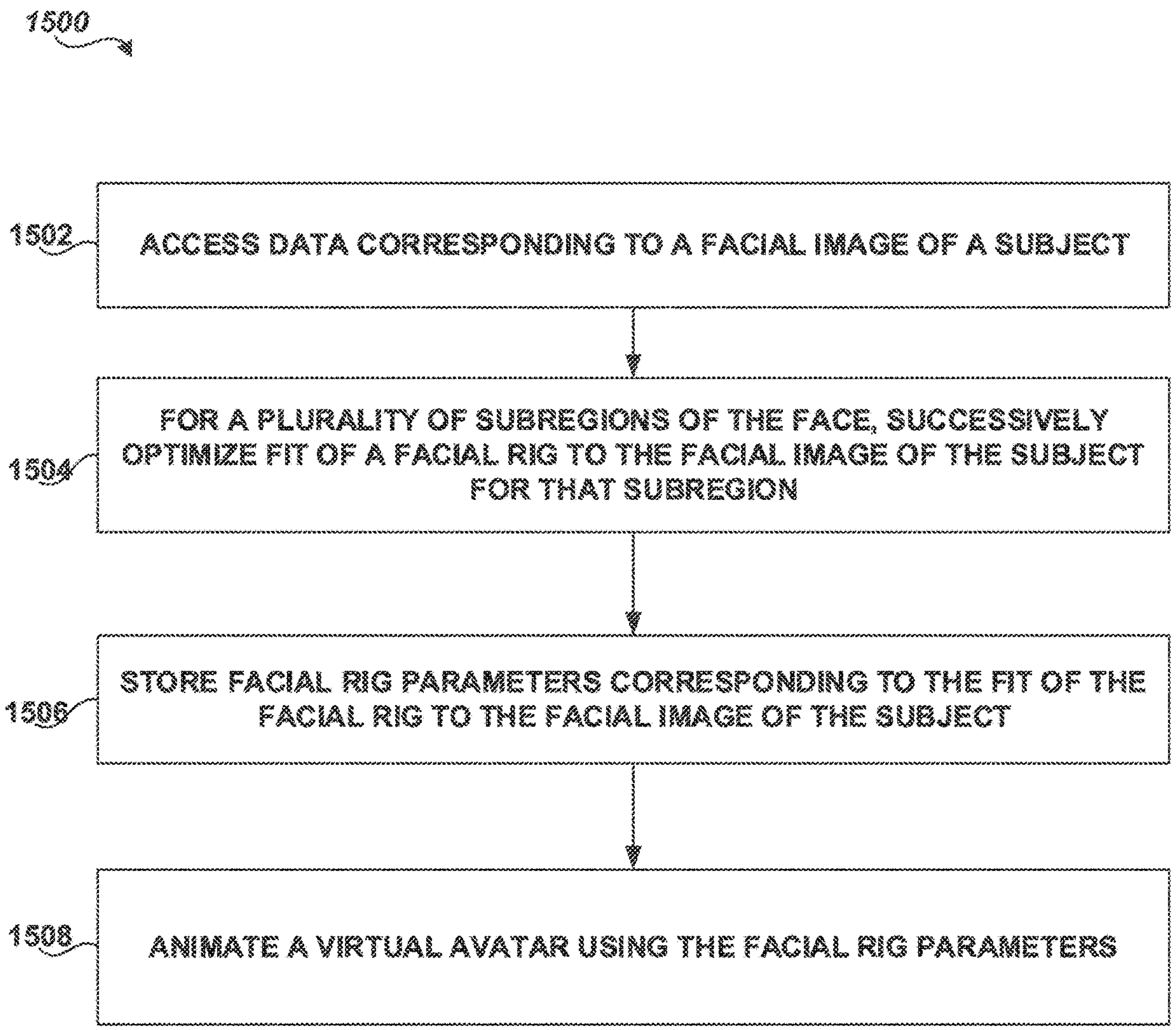
FIG. 15 illustrates an example process for animating a virtual avatar.

FIG. 15 illustrates an example process 1500 for determining a facial rig for an avatar. The process 1500 can be used for setting a facial rig for an avatar by iteratively fitting subregions of the face of the avatar to determine facial parameters of the facial rig associated with a subregion of a pose of the subject. The process 1500 can be performed and implemented by one or more computing devices or processing systems. For example, the process 1500 can be performed by a computing system associated with a photogrammetric capture stage configured to obtain image scans of the subject or a computing system that is associated with the wearable system 200, such as the avatar processing and rendering system 690 described with reference to FIG. 6B, such as the 3D model processing system 680.

At block 1502, the process 1500 accesses a facial image of the subject, who may be performing a pose in an animation sequence. The facial image may have been previously converted to a 3D digital representation of the pose, e.g., a structured or unstructured point cloud or a mesh of vertices. In some implementations, the process 1500 may (optionally) acquire 2D image data (e.g., from a photogrammetric stage) and calculate the 3D digital representation (sometimes called a 3D scan) of the subject using, e.g., 3D scanning, triangulation, or computer vision techniques.

At block 1504, the process 1500 performs an embodiment of the Facial Solver described herein (see, e.g., the process 1400 described with reference to FIG. 14). For example, the process 1500 may iterate over a plurality of subregions of the face according to a Solver Order (see, e.g., Table 2). In some cases, the sequence of priority in the Solver Order (e.g., first subregion to be processed to last subregion to be processed) is: 1) Jaw, 2) Lower Face, 3) Lips, 4) Funneler, 5) Upper Face, 6) Lids, 7) Eyes, 8) Neck, 9) Lip Extras, 10) Tongue, and 11) Miscellaneous Extras. The process 1500 can execute an optimization method to obtain the fit of the facial rig parameters for the subregion to the input facial image data. For example, the process 1500 may use the COBYLA optimization technique as a default technique. If COBYLA does not provide a suitable fit, the process 1500 may use the Nelder-Mead method (sometimes referred to as Simplex), the Levenberg-Marquardt algorithm (sometimes referred to as Least Squares), or the Newton Conjugate Gradient method. After the optimization for a first subregion is performed, the process 1500 continues to the next subregion, until all of the subregions in the Solver Order have been analyzed and a full facial rig for the entire face has been produced.

At block 1506, the process 1500 stores the facial rig parameters that have been determined by the Facial Solver to correspond to the input facial image. Thus, the process 1500 can generate a facial rig corresponding to a particular facial expression or emotion of the subject as shown in the input facial image (e.g., smiling, laughing, showing surprise, etc.). At optional block 1508, the process 1500 uses the facial parameters to animate a virtual avatar using the facial rig.

Although human animators have used human judgement and personalized techniques to animate avatars, the various embodiments of the methods disclosed herein provide automated (or at least semi-automated) animation methods based on a computerized set of rules (see, e.g., the process 1400) that can be applied to digital scans of a subject. Although the result may be substantially the same (e.g., avatar animation), the computerized technique is performed differently than the human operator's methods, which rely on individual human judgement and experience.

Example Software Code

The Appendix includes an example of computer programming pseudocode that can be used to implement an embodiment of the Facial Solver described herein. An embodiment of the processes 1400, 1500 can be implemented at least in part by the example code in the Appendix. The Appendix also includes description of the software code. The disclosure of the Appendix is intended to illustrate an example implementation of various features of the Facial Solver technology and is not intended to limit the scope of the technology. The Appendix is hereby incorporated by reference herein in its entirety so as to form a part of this specification.

Additional Aspects

In a first aspect, a system comprising: non-transitory storage configured to store image data representative of a subject performing a pose and information relating to a plurality of facial subregions; and a hardware processor in communication with the non-transitory storage, the hardware processor programmed to: access the image data; for each facial subregion in a solver order of facial subregions: reduce an error metric by adjusting a facial rig parameter for the facial subregion; and terminate and move to the next facial subregion in the solver order of facial subregions when a termination criterion is met; set a facial rig for the avatar based at least in part on the facial rig parameters determined for each of the facial subregions.

In a second aspect, the system of aspect 1, wherein an output facial rig parameter from a first facial subregion in the solver order is used as an input facial rig parameter for a second, subsequent subregion in the solver order.

In a third aspect, the system of aspect 1 or aspect 2, wherein to reduce the error metric, the hardware processor is programmed to use a constrained optimization by linear approximation (COBYLA) technique.

In a fourth aspect, the system of any one of aspects 1 to 3, wherein the facial subregions of the solver order comprise: (1) Jaw, (2) Lower Face, (3) Lips, (4) Funneler, (5) Upper Face, (6) Lids, (7) Eyes, (8) Neck, (9) Lip Extras, and (10) Tongue. In some of these aspects, the jaw region comprises a region corresponding to a jaw bone, the lower face region comprises a region corresponding to a nose and portions of cheeks above a jaw line, the lips region comprises a region corresponding to lips, the funneler region comprises a region corresponding to an area corresponding to the lips, a region above the jaw, and a region below the lower face region, the upper face region comprises a region corresponding to a forehead, the lids region comprises a region corresponding to one or more eyelids, the eyes region comprises a region corresponding to one or more eyes, the neck region comprises a region corresponding to a neck, the lip extras region comprises a region corresponding to temple veins, chin lines, or ear or cheek movements, or the tongue region comprises a region corresponding to a tongue.

In a fifth aspect, the system of any one of aspects 1 to 4, wherein the plurality of subregions is based at least in part on facial action coding system (FACS) taxonomy.

In a sixth aspect, the system of 5, wherein the facial ng parameter comprises a FACS action unit (AU).

In a seventh aspect, the system of any one of aspects 1 to 6, wherein the termination criterion comprises the error metric being reduced to below a threshold error or a maximum number of iterations being achieved.

In an eighth aspect, the system of any one of aspects 1 to 7, wherein the error metric comprises a minimization function in the form of an L2 norm or a Hausdorff distance.

In a ninth aspect, the system of any one of aspects 1 to 7, wherein the subject comprises a human being, a non-human animal, or a personified object.

In a tenth aspect, the system of any one of aspects 1 to 9, wherein the hardware processor is further programmed to label the facial rig parameters as corresponding to an emotion or an expression.

In an eleventh aspect, a display device comprising: a display configured to present a virtual image of the avatar to a user; and the system of any one of aspects 1 to 10.

In a twelfth aspect, an avatar control system comprising: non-transitory storage configured to store input data corresponding to an image of a subject; and a hardware processor in communication with the non-transitory storage, the hardware processor programmed to: access the input data corresponding to the image of the subject; successively execute, according to a solver order, a plurality of ordered optimizations that each iteratively adjust one or more facial rig parameters of a facial rig to match the input data until a termination criterion is met, wherein each of the plurality of ordered optimizations corresponds to a different facial subregion of the facial rig, and each optimization adjusts only facial rig parameters of the facial subregion on which the optimization is performed; responsive to the execution of each of the ordered optimizations, output the facial rig for the avatar based on the adjusted one or more facial rig parameters.

In a thirteenth aspect, avatar control system of aspect 12, wherein the solver order comprises: (1) Jaw, (2) Lower Face, (3) Lips, (4) Funneler, (5) Upper Face, (6) Lids, (7) Eyes, (8) Neck, (9) Lip Extras, and (10) Tongue.

In a fourteenth aspect, avatar control system of aspect 12 or aspect 13, wherein the solver order comprises a first subregion of the face and a second subregion of the face, the first subregion comprising a lower area of the face and the second subregion comprising an upper area of the face, the upper area smaller than the lower area.

In a fifteenth aspect, avatar control system of any of aspect 12-14, wherein at least one of the ordered optimizations comprises a constrained optimization by linear approximation (COBYLA) technique.

In a sixteenth aspect, avatar control system of any of aspect 12-15, wherein the adjusted facial rig parameters comprise facial action coding system action units.

In a seventeenth aspect, a system comprising: non-transitory storage configured to store facial image data for a person; and a hardware processor in communication with the non-transitory storage, the hardware processor programmed to: iteratively adjust first facial rig parameters of a first facial subregion of a facial rig for an avatar of the person until a first termination criterion is met; iteratively adjust second facial rig parameters of a second facial subregion of the facial rig until a second termination criterion is met; and set the facial rig for the avatar of the person based at least in part on the adjusted first facial rig parameters and the adjusted second facial rig parameters.

In an eighteenth aspect, the system of aspect 17, wherein the first facial subregion comprises a jaw subregion, and the second facial subregion comprises a lower face subregion, the lower face subregion comprising the nose and not comprising the jaw subregion.

In a nineteenth aspect, the system of aspect 17 of aspect 18, wherein the hardware processor is further programmed to: iteratively adjust third facial rig parameters of a third facial subregion of the facial rig until a third termination criterion is met, and wherein setting the facial rig for the avatar is further based at least in part on the adjusted third facial rig parameters.

In a twentieth aspect, the system of aspect 19, wherein the third facial subregion comprises a lips subregion.

In a twenty-first aspect, the system of any of aspects 17-20, wherein the hardware processor is further programmed to: iteratively adjust fourth facial rig parameters of a fourth facial subregion of the facial rig until a fourth termination criterion is met, and wherein setting the facial rig for the avatar is further based at least in part on the adjusted fourth facial rig parameters.

In a twenty-second aspect, the system of aspect 21, wherein the fourth facial subregion comprises an eyes subregion.

In a twenty-third aspect, the system of any of aspects 17-22, wherein at least one of the first termination criterion or the second termination criterion comprises an error metric between the facial rig and the facial image data being reduced below a threshold or a maximum number of iterations being exceeded.

In a twenty-fourth aspect, the system of any of aspects 17-23, wherein to iteratively adjust facial rig parameters, the hardware processor is programmed to execute a constrained optimization algorithm.

In a twenty-fifth aspect, a method comprising: accessing first facial rig data for a first facial rig; for each of a plurality of facial subregions: iteratively adjusting, for a first facial subregion of the plurality of facial subregions, second facial rig parameters of a second rig to match the first facial rig data for the first facial subregion of the first rig; and terminating and proceeding to a second subregion of the plurality of facial subregions when a termination condition is met; and outputting the second facial rig parameters.

In a twenty-sixth aspect, the system of aspect 25, wherein iteratively adjusting second facial rig parameters comprises solving an error minimization problem for an error metric between the first facial rig parameters and the second facial rig parameters for the first subregion.

In a twenty-seventh aspect, the system of aspect 25 or aspect 26, wherein a number of the plurality of facial subregions is greater than 3 and less than 14.

In a twenty-eighth aspect, the system of any of aspects 25-27, wherein the first facial subregion comprises a jaw subregion, and the second facial subregion comprises a lower face subregion, the lower face subregion comprising the nose and not comprising the jaw subregion.

In a twenty-ninth aspect, a method comprising: accessing image data for a region of a subject performing a pose; for each of a plurality of subregions of the region of the subject, fitting facial rig parameters to match at least a portion of the image data; and outputting a facial rig comprising the facial rig parameters fit for each of the plurality of subregions.

In a thirtieth aspect, the method of aspect 29, wherein the region of the subject comprises the face of the subject.

In a thirty-first aspect, the method of aspect 29 or aspect 30, wherein the subject comprises a human being.

In a thirty-second aspect, the method of any of aspects 29-31, wherein the subregions comprise a jaw subregion, a lower face subregion, a lips subregion, an upper face subregion, an eyelids subregion, and an eyes subregion.

In a thirty-third aspect, the method of any of aspects 29-32, wherein the fitting is performed according to a solver order, the solver order based at least in part on an impact each subregion has on animation of the virtual avatar.

In a thirty-fourth aspect, the system of any one of aspects 1-10 or aspects 12-24, the display device of aspect 11, or the method of any one of aspects 25-33 or 37-39, wherein subregions are processed according to a solver order, wherein the solver order is based at least in part on one or more of: sizes of the subregions, surface areas of the subregions, amounts of muscles in the subregions, measures of facial deformations in the subregions, or magnitudes of facial deformation vectors or flows for the subregions.

In a thirty-fifth aspect, a display device comprising: a display configured to present a virtual image of an avatar to a user; and the system of any one of aspects 12-24 or 40-41.

In a thirty-sixth aspect, a display device comprising: a display configured to present a virtual image of an avatar to a user; and a hardware processor comprising non-transitory memory, the hardware processor programed to perform the method of any one of aspects 25-33.

In a thirty-seventh aspect, a method comprising: accessing image data stored in non-transitory storage, the image data representative of a subject performing a pose; for each facial subregion in a solver order of facial subregions: reducing an error metric by adjusting a facial rig parameter for the facial subregion; and terminating and moving to the next facial subregion in the solver order of facial subregions when a termination criterion is met; and setting a facial rig for the avatar based at least in part on the facial rig parameters determined for each of the facial subregions.

In a thirty-eighth aspect, a method comprising: accessing input data corresponding to the image of the subject; successively executing, according to a solver order, a plurality of ordered optimizations that each iteratively adjust one or more facial rig parameters of a facial rig to match the input data until a termination criterion is met, wherein each of the plurality of ordered optimizations corresponds to a different facial subregion of the facial rig, and each optimization adjusts only facial rig parameters of the facial subregion on which the optimization is performed; and responsive to the execution of each of the ordered optimizations, outputting a facial rig for the avatar based on the adjusted facial rig parameters.

In a thirty-ninth aspect, a method comprising: iteratively adjusting first facial rig parameters of a first facial subregion of a facial rig until a first termination criterion is met; iteratively adjusting second facial rig parameters of a second facial subregion of a facial rig until a second termination criterion is met; and setting the facial rig for an avatar based at least in part on the adjusted first facial rig parameters and the adjusted second facial rig parameters.

In a fortieth aspect, a system comprising: non-transitory storage configured to facial rig data; and a hardware processor in communication with the non-transitory storage, the hardware processor programmed to: access the facial rig data for a first facial rig; for each of a plurality of facial subregions: iteratively adjust, for a first facial subregion of the plurality of facial subregions, second facial rig parameters of a second rig to match the first facial rig data for the first facial subregion of the first rig; and terminate and proceed to a second subregion of the plurality of facial subregions when a termination condition is met; and output the second facial rig parameters.

In a forty-first aspect, a system comprising: non-transitory storage configured to store image data representative of a subject performing a pose and information relating to a plurality of facial subregions; and a hardware processor in communication with the non-transitory storage, the hardware processor programmed to: access the image data for a region of the subject performing the pose; for each of a plurality of subregions of the region of the subject, fit facial rig parameters to match at least a portion of the image data; and output a facial rig comprising the facial rig parameters fit for each of the plurality of subregions.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image-processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can m some cases be excised from the combination, and the claimed combination may be directed to a subcombination or variation of a subcombination. No single feature or group of features is necessary or indispensable to each and every embodiment.

Conditional language used herein, such as, among others, “can,” “could,” “might,” “may,” “e.g.,” and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list. In addition, the articles “a,” “an,” and “the” as used in this application and the appended claims are to be construed to mean “one or more” or “at least one” unless specified otherwise.

As used herein, a phrase referring to “at least one of” a list of items refers to any combination of those items, including single members. As an example, “at least one of: A, B, or C” is intended to cover: A, B, C, A and B, A and C, B and C, and A, B, and C. Conjunctive language such as the phrase “at least one of X, Y and Z,” unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method comprising:

collecting first facial rig data with a head mounted, wearable system worn by a user and configured to obtain image scans of the user, including images of the eyes of the user with a camera that forms part of the head mounted, wearable system;

generating a first facial rig with first facial rig parameters from the first facial rig data;

for each of a plurality of facial subregions:

iteratively adjusting, for a first facial subregion of the plurality of facial subregions, second facial rig parameters of a second rig to match the first facial rig data for the first facial subregion of the first facial rig; and terminating and proceeding to a second subregion of the plurality of facial subregions when a termination condition is met; and outputting the second facial rig parameters.

2. The method of claim 1, wherein iteratively adjusting second facial rig parameters comprises solving an error minimization problem for an error metric between the first facial rig parameters and the second facial rig parameters for the first facial subregion.

3. The method of claim 1, wherein a number of the plurality of facial subregions is greater than 3 and less than 14.

4. The method of claim 1, wherein the first facial subregion comprises a Jaw subregion, and a second facial subregion of the plurality of facial subregions comprises a lower face subregion, the lower face subregion comprising a nose and not comprising the jaw subregion.

5. The method of claim 1, wherein the termination condition comprises all of the second facial rig parameters being within respective thresholds.

6. The method of claim 1, wherein the termination condition comprises wherein a maximum number of permitted iteration steps has been performed.

7. The method of claim 1, wherein the termination condition comprises an L2 norm error metric being less than a first error threshold.

8. The method of claim 1, wherein the termination condition comprises a Hausdorff distance error metric being less than a first error threshold.

9. The method of claim 1 wherein iteratively adjusting, for a first facial subregion of the plurality of facial subregions, second facial rig parameters of a second rig to match the first facial rig data for the first facial subregion of the first facial rig, further comprises:

iteratively adjusting one or more second facial rig parameters in accordance with a representation of emotion and a emotion intensity using a first taxonomy, to match the first facial rig data for the first facial subregion of the first facial rig.

10. A virtual reality/augmented reality (AR/VR) wearable system, comprising:

a head mounted display device configured to present a virtual image of an avatar to a user; and a camera coupled to the head mounted display device configured to collect first facial rig data and to obtain image scans of the user, including images of the eyes of the user;

a hardware computer processor coupled to the head mounted display device and the camera; and a non-transitory computer readable medium having software instructions stored thereon, the software instructions executable by the hardware computer processor to cause the system to perform operations comprising:

generating a first facial rig with first facial rig parameters from the first facial rig data;

for each of a plurality of facial subregions: iteratively adjusting, for a first facial subregion of the plurality of facial subregions, second facial rig parameters of a second rig to match the first facial rig data for the first facial subregion of the first facial rig; and terminating and proceeding to a second subregion of the plurality of facial subregions when a termination condition is met; and outputting the second facial rig parameters.

11. The virtual reality/augmented reality (AR/VR) wearable system of claim 10, wherein the iteratively adjusting the second facial rig parameters comprises solving an error minimization problem for an error metric between the first facial rig parameters and the second facial rig parameters for the first facial subregion.

12. The virtual reality/augmented reality (AR/VR) wearable system of claim 10, wherein a number of the plurality of facial subregions is greater than 3 and less than 14.

13. The virtual reality/augmented reality (AR/VR) wearable system of claim 10, wherein the first facial subregion comprises a jaw subregion, and a second facial subregion of the plurality of facial subregions comprises a lower face subregion, the lower face subregion comprising a nose and not comprising the jaw subregion.

14. The virtual reality/augmented reality (AR/VR) wearable system of claim 10, wherein the termination condition comprises all of the second facial rig parameters being within respective thresholds.

15. The virtual reality/augmented reality (AR/VR) wearable system of claim 10, wherein the termination condition comprises wherein a maximum number of permitted iteration steps has been performed.

16. The virtual reality/augmented reality (AR/VR) wearable system of claim 10, wherein the termination condition comprises an L2 norm error metric being less than a first error threshold or a Hausdorff distance error metric being less than a first error threshold.

* * * * *